United States Patent
Liu et al.

(10) Patent No.: US 11,102,796 B2
(45) Date of Patent: Aug. 24, 2021

(54) INFORMATION TRANSMISSION PROCESSING METHOD AND DEVICE, NODE, STORAGE MEDIUM AND PROCESSOR

(71) Applicant: ZTE CORPORATION, Guangdong (CN)

(72) Inventors: Juan Liu, Shenzhen (CN); Yajun Zhao, Shenzhen (CN); Ling Yang, Shenzhen (CN); Hanqing Xu, Shenzhen (CN); Xincai Li, Shenzhen (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 43 days.

(21) Appl. No.: 16/497,241

(22) PCT Filed: Mar. 21, 2018

(86) PCT No.: PCT/CN2018/079858
§ 371 (c)(1),
(2) Date: Sep. 24, 2019

(87) PCT Pub. No.: WO2018/171632
PCT Pub. Date: Sep. 27, 2018

(65) Prior Publication Data
US 2020/0389904 A1    Dec. 10, 2020

(30) Foreign Application Priority Data
Mar. 24, 2017  (CN) .................. 201710184655.2

(51) Int. Cl.
*H04W 72/04* (2009.01)
*H04W 4/00* (2018.01)
(Continued)

(52) U.S. Cl.
CPC ......... *H04W 72/10* (2013.01); *H04W 52/367* (2013.01); *H04W 72/0446* (2013.01); *H04W 72/06* (2013.01); *H04W 72/082* (2013.01)

(58) Field of Classification Search
None
See application file for complete search history.

(56) References Cited

U.S. PATENT DOCUMENTS

| 2013/0223258 A1* | 8/2013 | Seo ..................... H04W 52/243 370/252 |
| 2014/0146696 A1 | 5/2014 | Lin et al. |

(Continued)

FOREIGN PATENT DOCUMENTS

| CN | 103023614 A | 4/2013 |
| CN | 104938008 A | 9/2015 |

(Continued)

OTHER PUBLICATIONS

International Search Report of Application No. PCT/CN2018/079858—4 pages (dated May 30, 2018).

(Continued)

*Primary Examiner* — Gary Lafontant
(74) *Attorney, Agent, or Firm* — Knobbe, Martens, Olson & Bear, LLP

(57) ABSTRACT

Provided is an information transmission processing method and device, a node, storage medium and processor. The information transmission processing method comprises: a first predefined pattern of a first network node is determined, where the first predefined pattern comprises a link direction of a system resource of the first network node and a priority of the link direction; and information transmission according to the first predefined pattern is processed.

17 Claims, 4 Drawing Sheets

Determine a first predefined pattern of a first network node is determined, where the first predefined pattern includes a link direction of a system resource of the first network node and a priority of the link direction — S102

Process information transmission according to the first predefined pattern — S104

(51) Int. Cl.
*H04W 72/10* (2009.01)
*H04W 52/36* (2009.01)
*H04W 72/06* (2009.01)
*H04W 72/08* (2009.01)

(56) References Cited

U.S. PATENT DOCUMENTS

2014/0334353 A1  11/2014  Wei
2015/0365941 A1  12/2015  Liu et al.
2017/0041122 A1   2/2017  Li et al.
2019/0028188 A1*  1/2019  Feng .................... H04L 1/1854

FOREIGN PATENT DOCUMENTS

CN         106028452 A1  10/2016
WO  WO 2014/113941 A1   7/2014
WO       2015160184 A1  10/2015

OTHER PUBLICATIONS

Supplementary European Search Report for EP 18772271 dated Dec. 14, 2020.

* cited by examiner ical Field

The present disclosure relates to a field of communications and, in particular, to an information transmission processing method and device, a node, storage medium and processor.

BACKGROUND

At present, digital communication systems use a system-set sub-frame ratio mode. That is to say, a link direction of system transmission is preset, namely, a sub-frame direction is predetermined. For example, when a sub-frame is preset as a downlink sub-frame, this subframe can only transmit downlink data. Even if there is no data to be transmitted in the downlink, downlink resources cannot be occupied by other nodes for transmitting data, and vice versa. That is to say, the sub-frame direction is predefined and unchangeable. It can be seen that each sub-frame has a single priority of the link direction in the relate art.

The single priority of the link direction leads to a waste of radio resources. Especially when an uplink-to-downlink traffic ratio is significantly different from an uplink-to-downlink sub-frame ratio, the waste is more prominent.

In Release-14, flexible duplex is a research hotspot. Flexible duplex may achieve balance between uplink traffic and downlink traffic at a certain extent. However, in a case of demand for a large amount of the system traffic, the cross-link interference between base stations and between user equipment (UEs) will seriously affect performance of the entire communication system. When the load is relatively heavy, uplink or downlink performance of the entire system is greatly reduced because the flexible uplink and downlink technology does not contain an interference suppression method.

For the technical problems in the related art, no effective solution has been proposed so far.

SUMMARY

Embodiments of the present disclosure provide an information transmission processing method and device, a node, storage medium and processor, to at least solve degradation of uplink or downlink performance of a system in the related art.

According to an embodiment, an information transmission processing method is provided. The method includes the steps described below. A first predefined pattern of a first network node is determined, where the first predefined pattern includes a link direction of a system resource of the first network node and a priority of the link direction; and information transmission is processed according to the first predefined pattern.

Optionally, before information transmission is processed according to the first predefined pattern, the method further includes a step described below. A second predefined pattern transmitted by a second network node is received, where the second predefined pattern is used for adjusting the first predefined pattern. Accordingly, the step in which the information transmission is processed according to the first predefined pattern includes a step described below. The information transmission is processed according to a pattern resulting from adjustment of the first predefined pattern with the second predefined pattern.

Optionally, the step in which the second predefined pattern transmitted by the second network node is received includes one of following steps described below. The second predefined pattern transmitted by the second network node is received through an interaction with the second network node; or the second predefined pattern broadcasted by the second network node is received.

Optionally, the second network node includes one of followings: one or more nodes of all nodes in a network with a predetermined range except the first network node; one or more base station nodes of all base station nodes in the network with the predetermined range; one or more user equipment nodes of all user equipment nodes in the network with the predetermined range; one or more nodes included in a predetermined unit of the network with the predetermined range, where the predetermined unit includes one of followings: a sector, a base station, or a unit composed of one or more nodes.

Optionally, the step in which the second predefined pattern transmitted by the second network node is received includes one of following steps described below. The second predefined pattern transmitted by the second network node with a predetermined period is received; or the second predefined pattern non-periodically transmitted by the second network node is received.

Optionally, the step in which the second predefined pattern transmitted by the second network node with the predetermined period is received includes at least one of following steps described below. The second predefined pattern transmitted by the second network node is received through an interaction with the second network node according to the predetermined period; or the second predefined pattern broadcasted by the second network node is received according to the predetermined period. The predetermined period includes at least one of followings: one or more slots, one or more min slots, one or more non-slots, one or more sub-frames, or a number N of milliseconds, where N is a natural number greater than zero.

Optionally, the step in which the second predefined pattern non-periodically transmitted by the second network node is received includes steps described below. It is determined to interact with the second network node or to trigger the second network node to broadcast according to arrival of a data packet and/or a network load in the network; and the second predefined pattern transmitted by the second network node is received.

Optionally, the system resource includes: a time domain resource and/or a frequency domain resource. The time domain resource includes at least one of followings: one or more min slots, one or more non-slots, one or more slots, one or more sub-frames, one or more radio frames, an unfixed period of time, or a fixed period of time; and the frequency domain resource includes at least one of: one or more resource blocks, one or more sub-bands, an unfixed bandwidth or a fixed bandwidth.

Optionally, before the first predefined pattern of the first network node is determined, the method further includes a step described below. The priority of the link direction is determined in at least one of following manners: the priority of the link direction is determined according to a load size or a cache data size of a system where the first network node is located; the priority of the link direction is determined according to an information transmitted on the system resource of the system where the first network node is located; the priority of the link direction is determined according to a priority relationship between a link direction of a primary cell and a link direction of a secondary cell of the system where the first network node is located; the priority of the link direction is determined according to a priority relationship of link directions of different system resources of the system where the first network node is located; the priority of the link direction is determined according to a priority relationship of different subcarrier spacings of the system where the first network node is located; the priority of the link direction is determined according to a predetermined priority of the link direction; or the priority of the link direction is determined in a customized manner.

Optionally, the priority of the link direction includes at least one of following combinations: an uplink direction with a high priority, and a downlink direction with the high priority; an uplink direction with the high priority, a downlink direction with the high priority, and a mixed priority; an uplink direction with the high priority, an uplink direction with a less high priority, a downlink direction with the high priority, a downlink direction with the less high priority, and the mixed priority; an uplink direction with the high priority, a downlink direction with the high priority, and a downlink direction with the less high priority; an uplink direction with the high priority, a downlink direction with the high priority, a downlink direction with the less high priority, and the mixed priority; an uplink direction with the high priority, an uplink direction with the less high priority, and a downlink direction with the high priority; an uplink direction with the high priority, an uplink direction with the less high priority, a downlink direction with the high priority, and the mixed priority; an uplink direction with the high priority, and an uplink direction with the less high priority; an uplink direction with the high priority, an uplink direction with the less high priority, and the mixed priority; a downlink direction with the high priority, and a downlink direction with the less high priority; a downlink direction with the high priority, a downlink direction with the less high priority, and the mixed priority; the mixed priority; the priority of the link direction being dominated by an uplink direction with the high priority, and the priority of the link direction being dominated by a downlink direction with the high priority; the priority of the link direction being dominated by an uplink direction with the high priority, the priority of the link direction being dominated by a downlink direction with the high priority, and the mixed priority; the priority of the link direction being dominated by a downlink direction with the high priority, and the mixed priority; or the priority of the link direction being dominated by an uplink direction with the high priority, and the mixed priority; where the mixed priority has a same priority for the uplink direction and the downlink direction.

Optionally, before the information transmission is processed according to the first predefined pattern, the method further includes a step described below. According to the first predefined pattern, at least one of following operations is executed: a sensing operation, adjusting transmit power of a transmitter in cross-link, or adjusting a spatial direction of the first network node.

Optionally, for a link direction with a high priority in the first predefined pattern, at least one of following operations is executed: selecting a sensing mechanism with a probability of sensing success greater than a first predetermined threshold and executing the sensing operation, not executing the sensing operation, increasing the transmit power of the transmitter in the network, or adjusting the spatial direction of the transmitter in the network to a first direction, where a transmit signal has an intensity greater than a second predetermined threshold in the first direction; for a link direction with a low priority in the first predefined pattern, at least one of following operations is executed: selecting a sensing mechanism with the probability of sensing success less than a third predetermined threshold and executing the sensing operation, not executing the sensing operation, decreasing the transmit power of the transmitter in the network, or adjusting the spatial direction of the transmitter in the network to a second direction, where the transmit signal has an intensity less than a fourth predetermined threshold in the second direction.

Optionally, the step in which the information transmission is processed according to the first predefined pattern includes steps described below. When in the link direction with the high priority information is transmitted in a same link direction, and an amount of the information in a system buffer is larger than a predetermined threshold, or specified information needs to be transmitted, an information is transmitted in at least one of following manners: the information is transmitted directly, the information is transmitted with high power, the information is transmitted in a spatial direction corresponding to the first direction, or the information is transmitted according to the sensing mechanism with the probability of sensing success greater than the first predefined threshold; when in the link direction with the high priority no information is transmitted or a probability of transmitting no information is larger than a fifth predetermined threshold, in the link direction with the low priority or a link direction opposite to the link direction with the high priority the information is transmitted in at least one of following manners: the information is transmitted with the low power, the information is transmitted in a spatial direction corresponding to the second direction, or the information is transmitted according to the sensing mechanism with the probability of sensing success less than the third predefined threshold.

Optionally, the probability of sensing success is related to a selected sensing moment of the sensing operation or a contention window size.

Optionally, the sensing operation is executed by one of following subjects: a transmitting node in the network, a receiving node in the network, a node on a base station side, or a node on a user equipment side.

Optionally, the sensing operation is executed on at least one of following sensing moments or sensing time periods: a start moment or an end moment of one or more symbols before a moment for transmitting information; an end moment of one or more sub-frames, slots, min slots or non-slots before a sub-frame, slot, min slot or non-slot for transmitting the information; or a moment or time period before transmitting the information.

Optionally, the step in which the sensing operation is executed includes at least one of following steps. One or more candidate sensing moments are selected to execute the sensing operation; or a listen-before-talk (LBT) mechanism in a licensed assisted access (LAA) standard or an LBT mechanism in a wireless local area network (WLAN) standard is selected to execute the sensing operation.

Optionally, the one or more candidate sensing moments are equally or unequally spaced.

Optionally, before the information transmission is processed according to the first predefined pattern, the method further includes a step described below. Through a bitmap, the priority of the link direction in the first predefined pattern is notified to a user equipment.

According to an embodiment of present disclosure, an information transmission processing device is provided. The device includes a determination module and a processing module. The determination module is configured to determine a first predefined pattern of a first network node, where the first predefined pattern includes a link direction of a system resource of the first network node and a priority of the link direction. The processing module is configured to process information transmission according to the first predefined pattern.

Optionally, the device further includes a receiving module. The receiving module is configured to receive a second predefined pattern transmitted by a second network node, where the second predefined pattern is used for adjusting the first predefined pattern. The processing module is further configured to process the information transmission according to a pattern resulting from adjustment of the first predefined pattern with the second predefined pattern.

Optionally, the receiving module is further configured to execute one of following operations: receiving the second predefined pattern transmitted by the second network node through an interaction with the second network node; or receiving the second predefined pattern broadcasted by the second network node.

Optionally, the determination module is further configured to determine the priority of the link direction in at least one of following manners: the priority of the link direction is determined according to a load size or a cache data size of a system where the first network node is located; the priority of the link direction is determined according to an information transmitted on the system resource of the system where the first network node is located; the priority of the link direction is determined according to a priority relationship between a link direction of a primary cell and a link direction of a secondary cell of the system where the first network node is located; the priority of the link direction is determined according to a priority relationship of link directions of different system resources of the system where the first network node is located; the priority of the link direction is determined according to a priority relationship of different subcarrier spacings of the system where the first network node is located; the priority of the link direction is determined according to a predetermined priority of the link direction; or the priority of the link direction is determined in a customized manner.

Optionally, the priority of the link direction includes at least one of following combinations: an uplink direction with a high priority, and a downlink direction with the high priority; an uplink direction with the high priority, a downlink direction with the high priority, and a mixed priority; an uplink direction with the high priority, an uplink direction with a less high priority, a downlink direction with the high priority, a downlink direction with the less high priority, and the mixed priority; an uplink direction with the high priority, a downlink direction with the high priority, and a downlink direction with the less high priority; an uplink direction with the high priority, a downlink direction with the high priority, a downlink direction with the less high priority, and the mixed priority; an uplink direction with the high priority, an uplink direction with the less high priority, and a downlink direction with the high priority; an uplink direction with the high priority, an uplink direction with the less high priority, a downlink direction with the high priority, and the mixed priority; an uplink direction with the high priority, and an uplink direction with the less high priority; an uplink direction with the high priority, an uplink direction with the less high priority, and the mixed priority; a downlink direction with the high priority, and a downlink direction with the less high priority; a downlink direction with the high priority, a downlink direction with the less high priority, and the mixed priority; the mixed priority; the priority of the link direction being dominated by an uplink direction with the high priority, and the priority of the link direction being dominated by a downlink direction with the high priority; the priority of the link direction being dominated by an uplink direction with the high priority, the priority of the link direction being dominated by a downlink direction with the high priority, and the mixed priority; the priority of the link direction being dominated by a downlink direction with the high priority, and the mixed priority; and the priority of the link direction being dominated by an uplink direction with the high priority, and the mixed priority; where the mixed priority has a same priority for the uplink direction and the downlink direction.

Optionally, the device further includes an interference suppression module. The interference suppression module is configured to execute, according to the first predefined pattern, at least one of following operation: a sensing operation, adjusting transmit power of a transmitter in cross-link, or adjusting a spatial direction of the first network node.

Optionally, the interference suppression module is further configured to: execute, for a link direction with a high priority in the first predefined pattern, at least one of following operations: selecting a sensing mechanism with a probability of sensing success greater than a first predetermined threshold and executing the sensing operation, not executing the sensing operation, increasing the transmit power of the transmitter in the network, or adjusting the spatial direction of the transmitter in the network to a first direction, where a transmit signal has an intensity greater than a second predetermined threshold in the first direction; and/or, execute, for a link direction with a low priority in the first predefined pattern, at least one of following operations: selecting a sensing mechanism with the probability of sensing success less than a third predetermined threshold and executing the sensing operation, not executing the sensing operation, decreasing the transmit power of the transmitter in the network, or adjusting the spatial direction of the transmitter in the network to a second direction, where the transmit signal has an intensity less than a fourth predetermined threshold in the second direction.

Optionally, the processing module is further configured to: when in the link direction with the high priority information is transmitted in a same link direction, and an amount of the information in a system buffer is larger than a predetermined threshold value, or specified information needs to be transmitted, transmit an information by at least one of following manners: directly transmitting the information, transmitting the information with high power, transmitting the information in a spatial direction corresponding to the first direction, or transmitting the information according to the sensing mechanism with the probability of sensing success greater than the first predefined threshold; and when in the link direction with the high priority no information is transmitted or a probability of transmission no information is larger than a fifth predetermined threshold, transmit the information in the link direction with the low priority or a link direction opposite to the link direction with the high priority in at least one of following manners: transmitting the information with the low power, transmitting the information in a spatial direction corresponding to the second direction, or transmitting the information according to the sensing mechanism with the probability of sensing success less than the third predefined threshold.

Optionally, the probability of sensing success is related to a selected sensing moment of the sensing operation or a contention window size.

Optionally, the sensing operation is executed on at least one of following sensing moments or sensing time periods: a start moment or an end moment of one or more symbols before a moment for transmitting information transmission; an end moment of one or more sub-frames, slots, min slots or non-slots before a sub-frame, slot, min slot or non-slot for transmitting the information; or a moment or time period before transmitting the information.

Optionally, the interference suppression module is further configured to execute at least one of following operations: selecting one or more candidate sensing moments to execute the sensing operation; or selecting a listen-before-talk (LBT) mechanism in a licensed assisted access LAA standard or a LBT mechanism in a wireless local area network (WLAN) standard to execute the sensing operation.

Optionally, the one or more candidate sensing moments are equally or unequally spaced.

Optionally, the device further includes a transmitting module. The transmitting module is configured to notify, through a bitmap, a user equipment of the priority of the link direction in the first predefined pattern.

According to an embodiment of present disclosure a node is provided. The node includes a processor and a memory. The processor is configured to, when executing a program stored in the memory, execute at least following operations: determining a first predefined pattern of a first network node, where the first predefined pattern includes a link direction of a system resource of the first network node and a priority of the link direction; and processing information transmission according to the first predefined pattern. The memory is coupled to the processor and is used for storing the program.

Optionally, the processor is further configured to, when executing the program stored in the memory, execute following operations: receiving a second predefined pattern transmitted by a second network node, where the second predefined pattern is used for adjusting the first predefined pattern; and processing the information transmission according to a pattern resulting from adjustment of the first predefined pattern with the second predefined pattern.

Optionally, the processor is further configured to execute following operations when executes the program stored in the memory: receiving the second predefined pattern transmitted by the second network node through an interaction with the second network node; and receiving the second predefined pattern broadcasted by the second network node.

Optionally, the processor is further configured to, when executing the program stored in the memory, determine the priority of the link direction in at least one of following manners: the priority of the link direction is determined according to a load size or a cache data size of a system where the first network node is located; the priority of the link direction is determined according to an information transmitted on the system resource of the system where the first network node is located; the priority of the link direction is determined according to a priority relationship between a link direction of a primary cell and a link direction of a secondary cell of the system where the first network node is located; the priority of the link direction is determined according to a priority relationship of link directions of different system resources of the system where the first network node is located; the priority of the link direction is determined according to a priority relationship of different subcarrier spacings of the system where the first network node is located; the priority of the link direction is determined according to a predetermined priority of the link direction; or the priority of the link direction is determined in a customized manner.

Optionally, the priority of the link direction includes at least one of following combinations: an uplink direction with a high priority, and a downlink direction with the high priority; an uplink direction with the high priority, a downlink direction with the high priority, and a mixed priority; an uplink direction with the high priority, an uplink direction with a less high priority, a downlink direction with the high priority, a downlink direction with the less high priority, and the mixed priority; an uplink direction with the high priority, a downlink direction with the high priority, and a downlink direction with the less high priority; an uplink direction with the high priority, a downlink direction with the high priority, a downlink direction with the less high priority, and the mixed priority; an uplink direction with the high priority, an uplink direction with the less high priority, and a downlink direction with the high priority; an uplink direction with the high priority, an uplink direction with the less high priority, a downlink direction with the high priority, and the mixed priority; an uplink direction with the high priority, and an uplink direction with the less high priority; an uplink direction with the high priority, an uplink direction with the less high priority, and the mixed priority; a downlink direction with the high priority, and a downlink direction with the less high priority; a downlink direction with the high priority, a downlink direction with the less high priority, and the mixed priority; the mixed priority; the priority of the link direction being dominated by an uplink direction with the high priority, and the priority of the link direction being dominated by a downlink direction with the high priority; the priority of the link direction being dominated by an uplink direction with the high priority, the priority of the link direction being dominated by a downlink direction with the high priority, and the mixed priority; the priority of the link direction being dominated by a downlink direction with the high priority, and the mixed priority; and the priority of the link direction being dominated by an uplink direction with the high priority, and the mixed priority; where the mixed priority has a same priority for the uplink direction and the downlink direction.

Optionally, the processor is further configured to, when executing the program stored in the memory, execute following operations: executing, according to the first predefined pattern, at least one of following operations: a sensing operation, adjusting transmit power of a transmitter in cross-link, or adjusting a spatial direction of the first network node.

Optionally, the processor is further configured to, when executing the program stored in the memory, execute following operations: for a link direction with a high priority in the first predefined pattern, executing at least one of following operations: selecting a sensing mechanism with a probability of sensing success greater than a first predetermined threshold and executing the sensing operation, not executing the sensing operation, increasing transmit power of the transmitter in the network, or adjusting the spatial direction of the transmitter in the network to a first direction, where a transmit signal has an intensity greater than a second predetermined threshold in the first direction; and/or, for a link direction with a low priority in the first predefined pattern, executing at least one of following operations: selecting a sensing mechanism with the probability of sensing success less than a third predetermined threshold and executing the sensing operation, not executing the sensing operation, decreasing the transmit power of the transmitter in the network, or adjusting the spatial direction of the transmitter in the network to a second direction, where the transmit signal has an intensity less than a fourth predetermined threshold in the second direction.

Optionally, the processor is further configured to, when executing the program stored in the memory, execute following operations: when in the link direction with the high priority information is transmitted in a same link direction, and an amount of the information in a system buffer is larger than a predetermined threshold, or specified information needs to be transmitted, transmitting an information by at least one of following manners: directly transmitting the information, transmitting the information with high power, transmitting the information in a spatial direction corresponding to the first direction, or transmitting the information according to the sensing mechanism with the probability of sensing success greater than the first predefined threshold; and when in the link direction with the high priority no information is transmitted or a probability of transmitting no information is larger than a fifth predetermined threshold, transmitting the information in the link direction with the low priority or a link direction opposite to of the link direction with the high priority in at least one of following manners: transmitting the information with the low power, transmitting the information in a spatial direction corresponding to the second direction, or transmitting the information according to the sensing mechanism with the probability of sensing success less than the third predefined threshold.

Optionally, the probability of sensing success is related to a selected sensing moment of the sensing operation or a contention window size.

Optionally, the sensing operation is executed on at least one of following sensing moments or sensing time periods: a start moment or an end moment of one or more symbols before a moment for transmitting information transmission; an end moment of one or more sub-frames, slots, min slots or non-slots before a sub-frame, slot, min slot or non-slot for transmitting the information; or a moment or time period before transmitting the information.

Optionally, the processor is also configured to execute at least one of following operations: selecting one or more candidate sensing moments to execute the sensing operation; or selecting a listen-before-talk (LBT) mechanism in a licensed assisted access (LAA) standard or an LBT mechanism in a wireless local area network (WLAN) standard to execute the sensing operation.

Optionally, the one or more candidate sensing moments are equally or unequally spaced.

Optionally, the processor is also configured to, when executing the program stored in the memory, execute following operations: notifying, through a bitmap, a user equipment of the priority of the link direction in the first predefined pattern.

According to an embodiment of present disclosure a storage medium is provided. The storage medium includes stored programs. The programs, when executed, implement the information transmission processing method described above.

According to an embodiment of present disclosure a processor is provided. The processor is used for performing programs. The programs, when executed, implement the information transmission processing method described above.

Through the present disclosure, a first predefined pattern of a first network node is determined, where the first predefined pattern includes a link direction and a priority of the link direction of a system resource of the first network node; then the information transmission is processed according to the first predefined pattern. So that different information transmissions can be processed in link directions with different priorities, so as to reduce the influence of the cross-link interference. The degradation of the system uplink or downlink performance in the related art can be solved, so as to archive an improvement of the uplink or downlink performance.

BRIEF DESCRIPTION OF DRAWINGS

The drawings described herein are for the purpose of providing a further understanding of the present disclosure and form a part of this disclosure. The illustrative embodiments of the present disclosure and the description thereof are for the purpose of explaining the present disclosure and not intended to unduly limit the present disclosure. Among the drawings.

DETAILED DESCRIPTION

The present disclosure will be described in details hereinafter according to the drawings in conjunction with the embodiments. It should be noted that the embodiments in this disclosure and features in the embodiments may be combined with each other without conflict.

It should be noted that the terms "first", "second" and so on in the description and claims of the present disclosure and the drawings are used to distinguish similar objects, which are not necessarily used to describe a specific order or sequence.

Embodiment 1

The embodiments of the present disclosure may operate on a network architecture composed of network nodes, and these network nodes may interact with each other, but it is not limited thereto.

Figure 1:
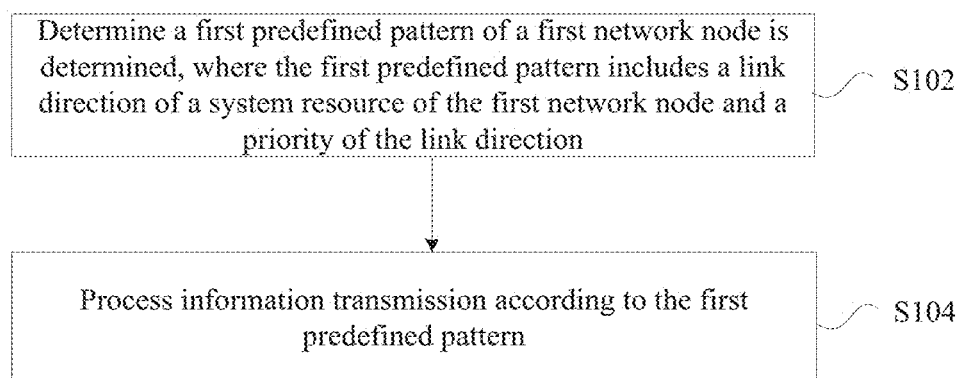
FIG. 1 is a flowchart of an information transmission processing method according to an embodiment of the present disclosure.

In this embodiment, an information transmission processing method operating on the network architecture is provided. FIG. 1 is a flowchart of an information transmission processing method according to an embodiment of the present disclosure. As shown in FIG. 1, the flowchart includes steps described below.

In step 102, a first predefined pattern of a first network node is determined. The first predefined pattern includes a link direction of a system resource of the first network node and a priority of the link direction.

In step 104, information transmission is processed according to the first predefined pattern.

Through the steps, the first predefined pattern of the first network node is determined, where the first predefined pattern includes the link direction of the system resource of the first network node and the priority of the link direction; the information transmission is processed according to the first predefined pattern. Through the information transmission process of the first predefined pattern including the priority of the link direction, different information transmissions can be processed in link directions with different priorities, so as to reduce the influence of the cross-link interference. Therefore, the degradation of system uplink or downlink performance in the related art can be solved, so as to archive an improvement of the uplink or downlink performance.

In an embodiment of the present disclosure, before the step 104, the method further includes a step described below. A second predefined pattern transmitted by a second network node is received. The second predefined pattern is used for adjusting the first predefined pattern. The step 104 may include a step described below. The information transmission is processed according to a pattern resulting from adjustment of the first predefined pattern with the second predefined pattern.

It should be noted that, the step in which the second predefined pattern transmitted by the second network node is received may include one of following steps described below. The second predefined pattern transmitted by the second network node is received through an interaction with the second network node; or the second predefined pattern broadcasted by the second network node is received.

For example, the first predefined pattern of the first network node in five consecutive slots is "DDDUU" and the second predefined pattern of the second network node is "UUDUU". It should be noted that, D indicates a downlink direction with a high priority, U indicates an uplink direction with a high priority. The interaction may be expressed as follows. The first network node and the second network node transmit their own predefined patterns to each other. That is, the first network node transmits the first predefined pattern to the second network node, and the second network node transmits the second predefined pattern to the first network node. After the first network node receives the second predefined pattern, the first network node performs learning and finds that downlink data in first and second slots has great interference to the first network node, so the first network node will adjust the first predefined pattern, such as to "UUDUU", but it is not limited thereto. However, the broadcast may be expressed as follows: the second network node broadcasts the second predefined pattern to the first network node. After receives the second predefined pattern, through learning the first network node finds that downlink data in first and second slots has great interference to the first network node, so the first network node will adjust the first predefined pattern, such as to "UUDUU".

It should be noted that, the second network node may include one of followings: one or more nodes of all nodes in a network with a predetermined range except the first network node; one or more base station nodes of all base station nodes in the network with the predetermined range; one or more user equipment nodes of all user equipment nodes in the network with the predetermined range; or one or more nodes included in a predetermined unit of the network with the predetermined range. The predetermined unit includes one of: a sector, a base station, or a unit composed of one or more nodes.

It should be noted that, the one or more nodes included in the predetermined unit may include one of: all nodes included in the predetermined unit, all base station nodes included in the predetermined unit, all UE nodes included in the predetermined unit, some scheduled nodes included in the predetermined unit, strongly interfering nodes included in the predetermined unit, or customized nodes included in the predetermined unit.

It should be noted that, the step in which the second predefined pattern transmitted by the second network node is received may include one of following steps describe below. The second predefined pattern transmitted by the second network node with a predetermined period is received; or the second predefined pattern non-periodically transmitted by the second network node is received.

It should be noted that, the second predefined pattern is also received according to the predetermined period, but it is not limited thereto.

It should be noted that, the step in which the second predefined pattern transmitted by the second network node with the predetermined period is received may include at least one of following steps described below. The second predefined pattern transmitted by the second network node is received through an interaction with the second network node according to the predetermined period; or the second predefined pattern broadcasted by the second network node according to the predetermined period is received. The predetermined period may include at least one of: one or more slots, one or more min slots, one or more non-slots, one or more sub-frames, or a number N of milliseconds, where N is a natural number greater than zero. The non-slot is one definition of time domain granularity in 5G (5th generation communication technology) of 3 GPP (3rd generation partnership project) standard.

It should be noted that, the step in which the second predefined pattern non-periodically transmitted by the second network node is received may include following steps. It is determined to interact with the second network node or to trigger the second network node to broadcast according to arrival of a data packet and/or a network load in the network; and the second predefined pattern transmitted by the second network node is received.

It should be noted that, in the network, the arrival of a data packet and/or the increase of network load may trigger an interaction with the second network node or trigger the second network node to broadcast, but it is not limited thereto.

It should be noted that, the system resource may include a time domain resource and/or a frequency domain resource. The time domain resource includes at least one of: one or more min slots, one or more non-slots, one or more slots, one or more sub-frames, one or more radio frames, an unfixed period of time, or a fixed period of time; and the frequency domain resource includes at least one of: one or more resource blocks, one or more sub-bands, an unfixed bandwidth or a fixed bandwidth.

It should be noted that, before the step 102, the method may further include a step described below. The priority of the link direction is determined in at least one of following manners: the priority of the link direction is determined according to a load size or a cache data size of a system where the first network node is located; the priority of the link direction is determined according to an information transmitted on the system resource of the system where the first network node is located; the priority of the link direction is determined according to a priority relationship between a link direction of a primary cell and a link direction of a secondary cell of the system where the first network node is located; the priority of the link direction is determined according to a priority relationship of link directions of different system resources of the system where the first network node is located; the priority of the link direction is determined according to a priority relationship of different subcarrier spacings of the system where the first network node is located; the priority of the link direction is determined according to a predetermined priority of the link direction; or the priority of the link direction is determined in a customized manner.

It should be noted that the step in which the priority of the link direction is determined according to the load size or the cache data size of the system where the first network node is located may be expressed as: a link direction with a large load within a time period serves as the link direction with the high priority, and vice versa; or a link direction with a large cache size serves as the link direction with the high priority, and vice versa, but it is not limited thereto.

It should be noted that, for example, a slot serves as the system resource, the priority of the link direction is determined according to the information transmitted on the system resource where the first network node is located may be expressed as: a slot, min slot or non-slot containing a physical uplink control channel (PUCCH), a physical random access channel (PRACH), a physical uplink shared channel (PUSCH) or sounding information is determined as the slot, min slot or non-slot with a high uplink priority; and a slot, min slot or non-slot containing a physical downlink control channel (PDCCH) or sounding reference signal (SRS) information is determined as the slot or min slot with a high downlink priority; but it is not limited thereto.

It should be noted that, the step in which the priority of the link direction is determined according to the priority relationship between the link direction of the primary cell and the link direction of the secondary cell of the system where the first network node is located may be expressed as follows. The priority of the link direction of the primary cell (Pcell) and the secondary cells (Scells) within a certain range is determined as followings: the priority of link directions of Scells under the Pcell may be determined by the Pcell; or, the Pcell may be obedient to the priority of link directions of most Scells; or the Pcell may be obedient to the priority of link direction of a Scell sending a control information or other important information, but it is not limited thereto.

It should be noted that, taking different system resources including min slots, non-slots and slots as an example, the priority of the link direction is determined according to the priority relationship of the link directions of different system resources of the system where the first network node is located may be expressed as follows: the priority of link directions of min slots or non-slot is determined by a corresponding slot; or a slot may be obedient to the priority of link directions of most min slots or non-slots. The priority relationship of link directions between the min slots or non-slots and slots is not limited within a certain time range.

It should be noted that, the step in which the priority of the link direction is determined according to the priority relationship of different subcarrier spacings of the system where the first network node is located may be expressed as follows. The link direction with a high priority is determined by a subcarrier with the largest carrier, or by a subcarrier bandwidth in a same direction and the largest link direction, but it is not limited thereto.

It should be noted that, the step in which the priority of the link direction is determined according to the predetermined priority of the link direction may be expressed as follows. When the predetermined priority of the link direction is a high priority, a link direction opposite to this link direction may have a low priority, and vice versa; but it is not limited thereto. It should be noted that the predetermined link direction may be a link direction of a conventional communication system, such as a TDD system or a FDD system, but it is not limited thereto.

It should be noted that, the customized priority of the link direction or the priority of the link direction may include at least one of following combinations: an uplink direction with a high priority, and a downlink direction with the high priority; an uplink direction with the high priority, a downlink direction with the high priority, and a mixed priority; an uplink direction with the high priority, an uplink direction with a less high priority, a downlink direction with the high priority, a downlink direction with the less high priority, and the mixed priority; an uplink direction with the high priority, a downlink direction with the high priority, and a downlink direction with the less high priority; an uplink direction with the high priority, a downlink direction with the high priority, a downlink direction with the less high priority, and the mixed priority; an uplink direction with the high priority, an uplink direction with the less high priority, and a downlink direction with the high priority; an uplink direction with the high priority, an uplink direction with the less high priority, a downlink direction with the high priority, and the mixed priority; an uplink direction with the high priority, and an uplink direction with the less high priority; an uplink direction with the high priority, an uplink direction with the less high priority, and the mixed priority; a downlink direction with the high priority, and a downlink direction with the less high priority; a downlink direction with the high priority, a downlink direction with the less high priority, and the mixed priority; the mixed priority; the priority of the link direction being dominated by an uplink direction with the high priority, and the priority of the link direction being dominated by a downlink direction with the high priority; the priority of the link direction being dominated by an uplink direction with the high priority, the priority of the link direction being dominated by a downlink direction with the high priority, and the mixed priority; the priority of the link direction being dominated by a downlink direction with the high priority, and the mixed priority; and the priority of the link direction being dominated by an uplink direction with the high priority, and the mixed priority; where the mixed priority has a same priority for the uplink direction and the downlink direction.

The combination of an uplink direction with the high priority, an uplink direction with a less high priority, a downlink direction with the high priority, a downlink direction with the less high priority, and the mixed priority (a same priority for the uplink direction and the downlink direction) is taken as an example to illustrate. In the example, a listen-before-talk (LBT) mechanism in a licensed assisted access (LAA) standard is used as an example: if the uplink direction has the high priority, the downlink has an access success probability of a1; the uplink direction has the less high priority, the downlink has an access success probability of a2; for the mixed priority, the downlink has an access success probability of a3, then a3>a2>a1. If the downlink direction has the high priority, the uplink has an access success probability of b1; the downlink direction has the less high priority, and the uplink has an access success probability of b2; as for the mixed priority, the uplink has an access success probability of b3, then b3>b2>b1.

It should be noted that, before the step 104, the method further includes a step described below.

According to the first predefined pattern, at least one of following operations is executed: a sensing operation, adjusting transmit power of a transmitter in cross-link, or adjusting a spatial direction of the first network node.

It should be noted that, the sensing operation may include the listen-before-talk (LBT) operation, but it is not limited thereto.

It should be noted that, the spatial direction may be a beam direction, but it is not limited thereto.

In an embodiment of the present disclosure, the step 104 may be expressed as: for a link direction with a high priority in the first predefined pattern, at least one of following operations is executed: a sensing mechanism with a probability of sensing success greater than a first predetermined threshold is selected and the sensing operation is executed; the sensing operation is not executed; the transmit power of the transmitter in the network is increased; or the spatial direction of the transmitter in the network is adjusted to a first direction. A transmit signal has an intensity greater than a second predetermined threshold in the first direction.

For a link direction with a low priority in the first predefined pattern, at least one of following operations is executed: a sensing mechanism with the probability of sensing success less than a third predetermined threshold is selected and the sensing operation is executed; the sensing operation is not executed; the transmit power of the transmitter in the network is decreased; or the spatial direction of the transmitter in the network is adjusted to a second direction. The transmit signal has an intensity less than a fourth predetermined threshold in the second direction. Through the operations, the cross-link interference can be effectively suppressed.

It should be noted that, the first direction may be a main lobe direction of the beam direction, and the second direction may be a zero point direction of the beam direction, but it is not limited thereto.

It should be noted that, the processing of the information transmission may include following steps. The information transmission is executed or not executed, but it is not limited thereto. Specifically, the step 104 may be expressed as: when in the link direction with the high priority information is transmitted in a same link direction, and an amount of the information in a system buffer is larger than a predetermined threshold, or specified information needs to be transmitted, an information is transmitted in at least one of following manners: the information is directly transmitted; the information is transmitted with high power, the information is transmitted in a spatial direction corresponding to the first direction, or the information is transmitted according to the sensing mechanism with the probability of sensing success greater than the first predefined threshold; when in the link direction with the high priority no information is transmitted or a probability of transmitting no information is larger than a fifth predetermined threshold, the information is transmitted in at least one of following manners in the link direction with the low priority or a link direction opposite to the link direction with the high priority: the information is transmitted with the low power, the information is transmitted in a spatial direction corresponding to the second direction, or the information is transmitted according to the sensing mechanism with the probability of sensing success less than the third predefined threshold. Through this way, it can be ensured that, data in the link direction with the high priority will be transmitted effectively with a large probability, while data in the link direction with the low priority will be transmitted with a small probability, thus may guarantee an effective utilization of the system resource.

It should be noted that, the specified information may be an important information, such as an information with a high transmission priority, but it is not limited thereto.

It should be noted that, the probability of sensing success is related to a selected sensing moment of the sensing operation or a contention window size.

It should be noted that, the sensing operation is executed by one of a transmitting node in the network, a receiving node in the network, a node on a base station side, or a node on a user equipment side.

It should be noted that, the sensing operation is executed on at least one of following sensing moments or sensing time periods: a start moment or an end moment of one or more symbols before a moment for transmitting information transmission; an end moment of one or more sub-frames, slots, min slots or non-slots before a sub-frame, slot, min slot or non-slot for transmitting the information; or a moment or time period before transmitting the information.

It should be noted that, the execution of the sensing operation may be expressed as at least one of steps described below. One or more candidate sensing moments are selected to execute the sensing operation; or a LBT mechanism in a licensed assisted access (LAA) standard or an LBT mechanism in a wireless local area network (WLAN) standard is selected to execute the sensing operation.

It should be noted that, the one or more candidate sensing moments are equally or unequally spaced. It should be noted that, for example, the candidate sensing moments may have an equally spaced interval of 9 microseconds, but it is not limited thereto.

In an embodiment of the present disclosure, before the step 104, the method may further include a step described below. Through a bitmap, the priority of the link direction in the first predefined pattern is notified to a user equipment.

Optionally, the steps may be executed by a network node, such as the first network node in the network architecture, but it is not limited thereto.

It should be noted that, the information may include data information and/or a control information, but it is not limited thereto.

From the description of the above embodiments, those skilled in the art may clearly understand that the method according to the embodiments may be implemented by using software plus necessary general hardware platforms, and of course, may also be implemented by using hardware, but in many cases the former is a better embodiment. Based on this understanding, the present disclosure may be embodied in the form of a software product stored in a storage medium (e.g. a ROM/RAM, a magnetic disk, an optical disk) and including multiple instructions to cause a terminal device (e.g. a mobile phone, a computer, a server, a network device, etc.) to execute the methods described in various embodiments of the present disclosure.

Embodiment 2

In an embodiment of the present disclosure an information transmission processing device is provided, which is used to implement the above embodiments and preferred embodiments, what has already been explained above will not be repeated here. As used below, the term "module" may be a combination of a software and/or hardware using for implementation a predetermined function. Although the device described in following embodiments are preferably implemented in software, but implementation by a hardware, or a combination of software and hardware is also possible and contemplated.

Figure 2:
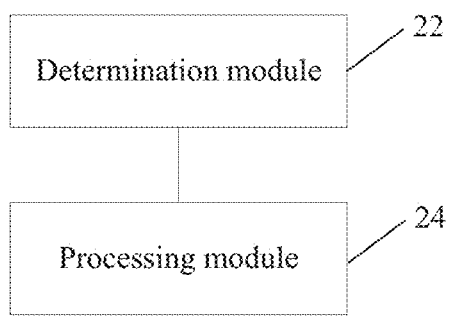
FIG. 2 is a structural diagram of an information transmission processing device according to an embodiment of the present disclosure.

FIG. 2 is a structural diagram of an information transmission processing device according to an embodiment of the present disclosure. As shown in FIG. 2, the device includes a determination module 22 and a processing module 24.

The determination module 22 is configured to determine a first predefined pattern of a first network node. The first predefined pattern includes a link direction of a system resource of the first network node and a priority of the link direction.

The processing module 24 is configured to process information transmission according to the first predefined pattern.

Through the device, the determination module 22 is configured to determine a first predefined pattern of a first network node, where the first predefined pattern includes a link direction of a system resource of the first network node and a priority of the link direction; the processing module 24 is configured to process information transmission according to the first predefined pattern. That is, the device processes the information transmission using the first predefined pattern including the priority of the link direction, so that different information transmissions can be processed in link directions with different priorities, and influence of the cross-link interference is further reduced. Therefore, the degradation of the system uplink or downlink performance in the related arts can be solved, so as to archive an improvement of the uplink or downlink performance.

In an embodiment of the present disclosure the device may further include a receiving module. The receiving module is connected to the processing module 24 and configured to receive a second predefined pattern transmitted by a second network node, where the second predefined pattern is used for adjusting the first predefined pattern. The processing module 24 is further configured to process the information transmission according to a pattern resulting from adjustment of the first predefined pattern with the second predefined pattern.

It should be noted that, the receiving module may further be configured to execute one of following operations: receiving the second predefined pattern transmitted by the second network node through an interaction with the second network node; or receiving the second predefined pattern broadcasted by the second network node.

It should be noted that, the second network node may include one of followings: one or more nodes of all nodes in a network with a predetermined range except the first network node; one or more base station nodes of all base station nodes in the network with the predetermined range; one or more user equipment nodes of all user equipment nodes in the network with the predetermined range; one or more nodes included in a predetermined unit of the network with the predetermined range, where the predetermined unit includes one of: a sector, a base station, or a unit composed of one or more nodes.

It should be noted that, the one or more nodes included in the predetermined unit may include one of: all nodes included in the predetermined unit, all base station nodes included in the predetermined unit, all UE nodes included in the predetermined unit, some scheduled nodes included in the predetermined unit, strongly interfering nodes included in the predetermined unit, or customized nodes included in the predetermined unit.

It should be noted that, the receiving module may further include one of following operations: receiving the second predefined pattern transmitted by the second network node with a predetermined period; receiving the second predefined pattern non-periodically transmitted by the second network node.

It should be noted that, the receiving module may receive the second predefined pattern also with the predetermined period, but it is not limited thereto.

It should be noted that, the receiving module may further be configured to execute one of following operations: receiving the second predefined pattern transmitted by the second network node through an interaction with the second network node according to the predetermined period; or receiving the second predefined pattern broadcasted by the second network node according to the predetermined period. The predetermined period includes at least one of: one or more slots, one or more min slots, one or more non-slots, one or more sub-frames, or a number N of milliseconds.

It should be noted that, the receiving module receives the second predefined pattern non-periodically transmitted by the second network node may include steps described below. It is determined to interact with the second network node or to trigger the second network node to broadcast according to arrival of a data packet and/or a network load in the network; and the second predefined pattern transmitted by the second network node is received.

It should be noted that, in the network, the arrival of a data packet and/or the increase of network load may trigger an interaction with the second network node or trigger the second network node to broadcast, but it is not limited thereto.

It should be noted that, the system resource may include a time domain resource and/or a frequency domain resource. The time domain resource includes at least one of: one or more min slots, one or more non-slots, one or more slots, one or more sub-frames, one or more radio frames, an unfixed period of time, or a fixed period of time; and the frequency domain resource includes at least one of: one or more resource blocks, one or more sub-bands, an unfixed bandwidth or a fixed bandwidth.

It should be noted that, the determination module 22 may further be configured to determine the priority of the link direction in at least one of following manners: determining the priority of the link direction according to a load size or a cache data size of a system where the first network node is located; the priority of the link direction is determined according to an information transmitted on the system resources of the system where the first network node is located; the priority of the link direction is determined according to a priority relationship between a link direction of a primary cell and a link direction of a secondary cell of the system where the first network node is located; the priority of the link direction is determined according to a priority relationship of link directions of different system resources in the system where the first network node is located; the priority of the link direction is determined according to a priority relationship of different subcarrier spacings of the system where the first network node is located; the priority of the link direction is determined according to a predetermined priority of the link direction; and the priority of the link direction is determined in a customized manner.

It should be noted that, an explanation of each determination manner may refer to the description of embodiment 1.

It should be noted that, the priority of the link direction includes at least one of following combinations: an uplink direction with a high priority, and a downlink direction with the high priority; an uplink direction with the high priority, a downlink direction with the high priority, and a mixed priority; an uplink direction with the high priority, an uplink direction with a less high priority, a downlink direction with the high priority, a downlink direction with the less high priority, and the mixed priority; an uplink direction with the high priority, a downlink direction with the high priority, and a downlink direction with the less high priority; an uplink direction with the high priority, a downlink direction with the high priority, a downlink direction with the less high priority, and the mixed priority; an uplink direction with the high priority, an uplink direction with the less high priority, and a downlink direction with the high priority; an uplink direction with the high priority, an uplink direction with the less high priority, a downlink direction with the high priority, and the mixed priority; an uplink direction with the high priority, and an uplink direction with the less high priority; an uplink direction with the high priority, an uplink direction with the less high priority, and the mixed priority; a downlink direction with the high priority, and a downlink direction with the less high priority; a downlink direction with the high priority, a downlink direction with the less high priority, and the mixed priority; the priority of the link direction being dominated by an uplink direction with the high priority, and the priority of the link direction being dominated by a downlink direction with the high priority; the priority of the link direction being dominated by an uplink direction with the high priority, the priority of the link direction being dominated by a downlink direction with the high priority, and the mixed priority; the priority of the link direction being dominated by a downlink direction with the high priority, and the mixed priority; and the priority of the link direction being dominated by an uplink direction with the high priority, and the mixed priority; where the mixed priority has a same priority for the uplink direction and the downlink direction.

It should be noted that, the description of each combination may refer to the description of embodiment 1.

It should be noted that, the device further includes an interference suppression module. The interference suppression module is connected to the processing module 24 and further configured to execute, according to the first predefined pattern, at least one of following operation: a sensing operation, adjusting transmit power of a transmitter in cross-link, or adjusting a spatial direction of the first network node.

It should be noted that, the sensing operation may include the LBT operation, but it is not limited thereto.

It should be noted that, the spatial direction may be a beam direction, but it is not limited thereto.

It should be noted that, the interference suppression module may further be configured to execute, for a link direction with a high priority in the first predefined pattern, at least one of following operations: selecting a sensing mechanism with a probability of sensing success greater than a first predetermined threshold and executing the sensing operation, not executing the sensing operation, increasing the transmit power of the transmitter in the network, or adjusting the spatial direction of the transmitter in the network to a first direction, where a transmit signal has an intensity greater than a second predetermined threshold in the first direction; and/or, the interference suppression module may also be configured to execute, for a link direction with a low priority in the first predefined pattern, at least one of following operations: selecting a sensing mechanism with the probability of sensing success less than a third predetermined threshold and executing the sensing operation, not executing the sensing operation, decreasing the transmit power of the transmitter in the network, or adjusting the spatial direction of the transmitter in the network to a second direction, where the transmit signal has an intensity less than a fourth predetermined threshold in the second direction.

It should be noted that, the first direction may be a main lobe direction of the beam direction, and the second direction may be a zero point direction of the beam direction, but it is not limited thereto.

It should be noted that, the processing module is further configured to: when in the link direction with the high priority information is transmitted in a same link direction, and an amount of the information in a system buffer is larger than a predetermined threshold, or specified information needs to be transmitted, transmit an information by at least one of following manners: directly transmitting the information, transmitting the information with high power, transmitting the information in a spatial direction corresponding to the first direction, or transmitting the information according to the sensing mechanism with the probability of sensing success greater than the first predefined threshold; and when in the link direction with the high priority no information is transmitted or a probability of transmission no information is larger than a fifth predetermined threshold, transmit the information in the link direction with the low priority or a link direction opposite to the link direction with the high priority in at least one of following manners: transmitting the information with the low power, transmitting the information in a spatial direction corresponding to the second direction, or transmitting the information according to the sensing mechanism with the probability of sensing success less than the third predefined threshold.

It should be noted that, the probability of sensing success is related to a selected sensing moment of the sensing operation or a contention window size.

It should be noted that, the sensing operation is executed on at least one of following sensing moments or sensing time periods: a start moment or an end moment of one or more symbols before a moment for transmitting information transmission; an end moment of one or more sub-frames, slots, min slots or non-slots before a sub-frame, slot, min slot or non-slot for transmitting the information; or a moment or time period before transmitting the information.

It should be noted that, the interference suppression module may further be configured to execute at least one of following operations: selecting one or more candidate sensing moments to execute the sensing operation; or selecting a listen-before-talk (LBT) mechanism in a licensed assisted access LAA standard or a LBT mechanism in a wireless local area network (WLAN) standard to execute the sensing operation.

It should be noted that, the one or more candidate sensing moments are equally or unequally spaced. For example, the candidate sensing moments may have an equally spaced interval of 9 microseconds, but it is not limited thereto.

It should be noted that, the device may further include a transmitting module. The transmitting module is configured to notify, through a bitmap, a user equipment of the priority of the link direction in the first predefined pattern.

Optionally, the device may be located in a network node, such as the first network node in the network architecture, but it is not limited thereto.

It should be noted that, each of the modules may be implemented by software or hardware, and the latter may be implemented in following manners, but it is not limited thereto. The modules may all be located in a same processor; alternatively, the modules may be located in different processors in any kind of combinations.

Embodiment 3

Figure 3:
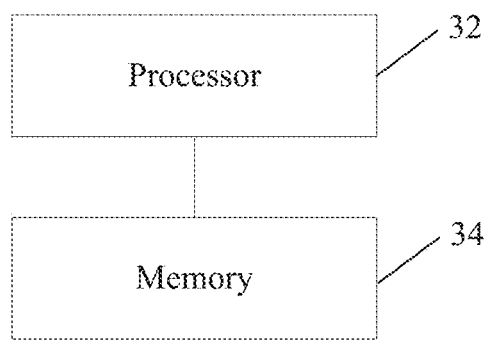
FIG. 3 is a structural diagram of a node according to an embodiment of the present disclosure.

In an embodiment of the present disclosure, a node is further provided. FIG. 3 is a structural diagram of a node according to an embodiment of the present disclosure. As shown in FIG. 3, the node includes a processor 32 and a memory 34.

The processor 32 is configured to, when executing a program stored in the memory 34, execute at least following operations.

A first predefined pattern of a first network node is determined, where the first predefined pattern includes a link direction of a system resource of the first network node and a link direction priority; and information transmission is processed according to the first predefined pattern.

The memory 34 is coupled to the processor 32 and is used for storing the program.

Through the node, the processor 32 is configured to, when executing a program stored in the memory 34, execute following operations. A first predefined pattern of a first network node is determined, where the first predefined pattern includes a link direction of a system resource of the first network node and a link direction priority; and information transmission is processed according to the first predefined pattern. The node processes the information transmission using the first predefined pattern including the priority of the link direction, so that different information transmissions can be processed in link directions with different priorities, so as to reduce influence of the cross-link interference. Therefore, the degradation of the system uplink or downlink performance in the related arts can be solved, so as to archive an improvement of the uplink or downlink performance.

In an embodiment of the present disclosure, the processor 32 may further be configured to, when executing a program stored in the memory 34, execute following operations.

A second predefined pattern transmitted by a second network node is received, where the second predefined pattern is used for adjusting the first predefined pattern; and the information transmission is processed according to a pattern resulting from adjustment of the first predefined pattern with the second predefined pattern.

It should be noted that, the processor 32 may further be configured to, when executing a program stored in the memory 34, execute at least one of following operations: the second predefined pattern transmitted by the second network node is received through an interaction with the second network node; or the second predefined pattern broadcasted by the second network node is received.

It should be noted that, the second network node may include one of: one or more nodes of all nodes in a network with a predetermined range except the first network node; one or more base station nodes of all base station nodes in the network with the predetermined range; one or more user equipment nodes of all user equipment nodes in the network with the predetermined range; one or more nodes included in a predetermined unit of the network with the predetermined range, where the predetermined unit includes one of: a sector, a base station, or a unit composed of one or more nodes.

It should be noted that, the one or more nodes included in the predetermined unit may include one of: all nodes included in the predetermined unit, all base station nodes included in the predetermined unit, all UE nodes included in the predetermined unit, some scheduled nodes included in the predetermined unit, strongly interfering nodes included in the predetermined unit, or customized nodes included in the predetermined unit.

It should be noted that, the processor 32 may further be configured to, when executing a program stored in the memory 34, execute at least one of following operations: the second predefined pattern transmitted by the second network node with a predetermined period is received; or the second predefined pattern non-periodically transmitted by the second network node is received.

It should be noted that, the processor 32 receives the second predefined pattern also with the predetermined period, but it is not limited thereto.

It should be noted that, the processor 32 may be configured to, when executing a program stored in the memory 34, execute at least one of following operations: the second predefined pattern transmitted by the second network node is received through an interaction with the second network node according to the predetermined period; or the second predefined pattern broadcasted by the second network node is received according to the predetermined period. It should be noted that, the predetermined period includes at least one of: one or more slots, one or more min slots, one or more non-slots, one or more sub-frames, or a number N of milliseconds.

It should be noted that, the processor 32 is configured to, when executing a program stored in the memory 34, at least receive the second predefined pattern non-periodically transmitted by the second network node, which includes steps described below. The processor 32 determines to interact with the second network node or to trigger the second network node to broadcast according to arrival of a data packet and/or a network load in the network, and receives the second predefined pattern transmitted by the second network node.

It should be noted that, in the network, the arrival of a data packet and/or the increase of network load may trigger an interaction with the second network node or trigger the second network node to broadcast, but it is not limited thereto.

It should be noted that, the system resource may include a time domain resource and/or a frequency domain resource. The time domain resource includes at least one of: one or more min slots, one or more non-slots, one or more slots, one or more sub-frames, one or more radio frames, an unfixed period of time, or a fixed period of time; and the frequency domain resource includes at least one of: one or more resource blocks, one or more sub-bands, an unfixed bandwidth or a fixed bandwidth.

It should be noted that, the processor 32 is further configured to, when executing a program stored in the memory 34, determine the priority of the link direction in at least one of following manners: the priority of the link direction is determined according to a load size or a cache data size of a system where the first network node is located; the priority of the link direction is determined according to an information transmitted on the system resources of the system where the first network node is located; the priority of the link direction is determined according to a priority relationship between a link direction of a primary cell and a link direction of a secondary cell of the system where the first network node is located; the priority of the link direction is determined according to a priority relationship of link directions of different system resources in the system where the first network node is located; the priority of the link direction is determined according to a priority relationship of different subcarrier spacings of the system where the first network node is located; the priority of the link direction is determined according to a predetermined priority of the link direction; or the priority of the link direction is determined in a customized manner.

It should be noted that, an explanation of each determination manner may refer to the description of embodiment 1.

It should be noted that, the priority of the link direction includes at least one of following combinations: an uplink direction with a high priority, and a downlink direction with the high priority; an uplink direction with the high priority, a downlink direction with the high priority, and a mixed priority; an uplink direction with the high priority, an uplink direction with a less high priority, a downlink direction with the high priority, a downlink direction with the less high priority, and the mixed priority; an uplink direction with the high priority, a downlink direction with the high priority, and a downlink direction with the less high priority; an uplink direction with the high priority, a downlink direction with the high priority, a downlink direction with the less high priority, and the mixed priority; an uplink direction with the high priority, an uplink direction with the less high priority, and a downlink direction with the high priority; an uplink direction with the high priority, an uplink direction with the less high priority, a downlink direction with the high priority, and the mixed priority; an uplink direction with the high priority, and an uplink direction with the less high priority; an uplink direction with the high priority, an uplink direction with the less high priority, and the mixed priority; a downlink direction with the high priority, and a downlink direction with the less high priority; a downlink direction with the high priority, a downlink direction with the less high priority, and the mixed priority; the mixed priority; the priority of the link direction being dominated by an uplink direction with the high priority, and the priority of the link direction being dominated by a downlink direction with the high priority; the priority of the link direction being dominated by an uplink direction with the high priority, the priority of the link direction being dominated by a downlink direction with the high priority, and the mixed priority; the priority of the link direction being dominated by a downlink direction with the high priority, and the mixed priority; or the priority of the link direction being dominated by an uplink direction with the high priority, and the mixed priority; where the mixed priority has a same priority for the uplink direction and the downlink direction.

It should be noted that, the description of each combination may refer to the description of embodiment 1.

It should be noted that, the processor 32 is also configured to, when executing the program stored in the memory 34, execute at least one of following operations according to the first predefined pattern: a sensing operation, adjusting transmit power of a transmitter in cross-link, or adjusting a spatial direction of the first network node.

It should be noted that, the sensing operation may include the listen-before-talk (LBT) operation, but it is not limited thereto.

It should be noted that, the spatial direction may be a beam direction, but it is not limited thereto.

It should be noted that, the processor 32 is also configured to, when executing the program stored in the memory 34, execute at least following operations for a link direction with a high priority in the first predefined pattern: selecting a sensing mechanism with a probability of sensing success greater than a first predetermined threshold and executing the sensing operation, not executing the sensing operation, increasing transmit power of the transmitter in the network, or adjusting the spatial direction of the transmitter in the network to a first direction, where a transmit signal has an intensity greater than a second predetermined threshold in the first direction; and/or, for a link direction with a low priority in the first predefined pattern, the processor 32 is further configured to execute at least following operations: selecting a sensing mechanism with the probability of sensing success less than a third predetermined threshold and executing the sensing operation, not executing the sensing operation, decreasing the transmit power of the transmitter in the network, or adjusting the spatial direction of the transmitter in the network to a second direction, where the transmit signal has an intensity less than a fourth predetermined threshold in the second direction.

It should be noted that, the first direction may be a main lobe direction of the beam direction, and the second direction may be a zero point direction of the beam direction, but it is not limited thereto.

It should be noted that, the processor 32 is configured to execute, when executing the program stored in the memory 34, at least following operations. When in the link direction with the high priority information is transmitted in a same link direction, and an amount of the information in a system buffer is larger than a predetermined threshold, or specified information needs to be transmitted, an information is transmitted by at least one of following manners: the information is transmitted directly, the information is transmitted with high power, the information is transmitted in a spatial direction corresponding to the first direction, or the information is transmitted according to the sensing mechanism with the probability of sensing success greater than the first predefined threshold. When in the link direction with the high priority no information is transmitted or a probability of transmitting no information is larger than a fifth predetermined threshold, the information is transmitted in the link direction with the low priority or a link direction opposite to of the link direction with the high priority in at least one of following manners: the information is transmitted with the low power, the information is transmitted in a spatial direction corresponding to the second direction, or the information is transmitted according to the sensing mechanism with the probability of sensing success less than the third predefined threshold.

It should be noted that, the probability of sensing success is related to a selected sensing moment of the sensing operation or a contention window size.

It should be noted that, the sensing operation is executed on at least one of following sensing moments or sensing time periods: a start moment or an end moment of one or more symbols before a moment for transmitting information transmission; an end moment of one or more sub-frames, slots, min slots or non-slots before a sub-frame, slot, min slot or non-slot for transmitting the information; or a moment or time period before transmitting the information.

It should be noted that, the processor 32 is configured to, when executing the program stored in the memory 34, execute at least one of following operations: one or more candidate sensing moments are selected to execute the sensing operation; or a listen-before-talk (LBT) mechanism in a licensed assisted access (LAA) standard or an LBT mechanism in a wireless local area network (WLAN) standard is selected to execute the sensing operation.

It should be noted that, the one or more candidate sensing moments are equally or unequally spaced. It should be noted that, the candidate sensing moments may have an equally spaced interval of 9 microseconds, but it is not limited thereto.

It should be noted that, the processor 32 is configured to, when executing the program stored in the memory 34, execute at least following operations: through a bitmap, the priority of the link direction in the first predefined pattern is notified to a user equipment.

Embodiment 4

An embodiment of the present disclosure further provides a storage medium, which includes stored computer-executable programs. When executed, the programs controls a device containing the storage medium to implement the method according to the embodiment 1.

Optionally, in this embodiment, the storage medium may include, but it is not limited to, a USB flash disk, a read-only memory (ROM), a random access memory (RAM), a mobile hard disk, a magnetic disk, a compact disk and other media that may store program codes.

An embodiment of the present disclosure further provides a processor. The processor is configured to execute computer programs. When executed, the programs implements steps in any method according to the embodiment 1.

Optionally, for technical details of this embodiment of the present disclosure, reference may be made to the description of the above embodiments and preferred embodiments of the present disclosure, what has been described will not be repeated herein In order to better understand the embodiments of the present disclosure, the present disclosure will be further explained below with reference to preferred embodiments.

Preferred Embodiment 1

In this preferred embodiment, determination of the link direction of a communication system resource may include following steps described below. A pattern of the link direction is predefined, after a priority of the link direction is determined according to the predefined pattern of the link direction, whether the link is transmitting or not is determined through sensing, meanwhile the interference may be controlled within a certain range.

Figure 4:
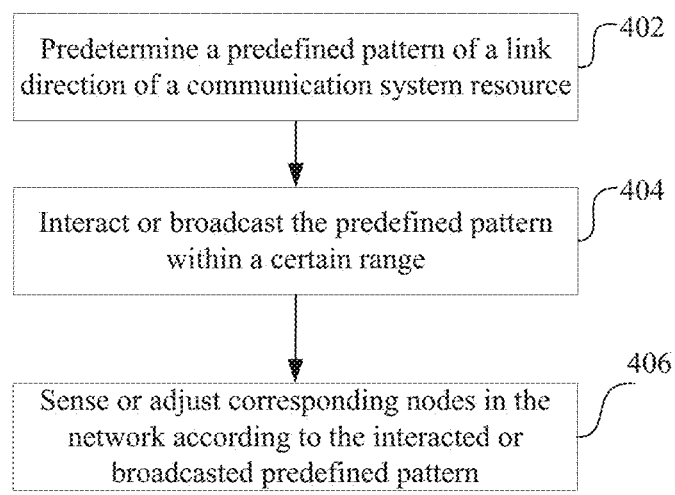
FIG. 4 is a flowchart of the information transmission processing method according to preferred embodiment 1 of the present disclosure.

FIG. 4 is a flowchart of the information transmission processing method according to preferred embodiment 1 of the present disclosure. As shown in FIG. 4, the method includes following steps described below.

In step 402, a predefined pattern (corresponding to the first predefined pattern in the above embodiments) of the link direction of the communication system resource is predetermined.

The system resource includes one or more kinds of resources described below.

The system resource may be one or more min slots, one or more non-slots, one or more slots, one or more sub-frames, one or more radio frames, an unfixed period of time, or a fixed period of time; the system resource may be one or more RBs, one or more sub-bands, an unfixed bandwidth or a fixed bandwidth.

For the predefined pattern, it may include the link direction of the system resource, priority characteristics of the link direction, etc.

In the system, the priority characteristics of the link direction may be determined according to one or more of followings conditions.

1) The priority characteristics of the link direction are determined according to a load size or a cache data size of the system. A link direction with a large load within a period of time serves as the link direction with the high priority, and vice versa; or a link direction with a large cache number will serve as the link direction with the high priority, and vice versa, but it is not limited thereto.

2) The priority characteristics of the link direction are determined according to the information transmitted on the system resource. A slot, min slot or non-slot containing a PUCCH, a PRACH, a PUSCH, or a sounding information serves as the slot, min slot or non-slot with a high uplink priority, and a slot, min slot or non-slot containing a PDCCH or a SRS information serves as the slot or min slot with a high downlink priority; but it is not limited thereto.

3) The priority characteristics of the link direction are determined according to a relationship between a Pcell and Scells in the system;

The priority characteristics of the link direction of the Pcell and Scells within a certain range are determined as follows: the Pcell determines the priority characteristics of link directions of Scells under the Pcell; or, the Pcell may be obedient to the priority characteristics of link directions of most Scells, or the Pcell may be obedient to the priority characteristics of link direction of a Scell sending a control information or other important information, but it is not limited thereto.

4) The priority characteristics of the link direction are determined according to different system resources of the system. Taking different system resources as min slots, non-slots and slots as an example, the priority characteristics of link directions of min slots or non-slots are determined by corresponding slot, or a slot may be obedient to the priority characteristics of the link direction of most min slots or non-slots. The priority relationship of link directions between the min slots or non-slots and slots is not limited within a certain time range.

5) The priority characteristics of the link direction are determined according to different subcarrier spacings of the system. For the link direction of subcarriers with different spacings, a link direction of a largest subcarrier may be determined as the link direction with the high priority.

6) The priority characteristics of the link direction are determined according to a traditional communication system. The traditional communication system has a fixed link direction, which is the link direction with the high priority, a link direction opposite to this link direction has a low priority.

7) The priority characteristics of the link direction are determined in a customized manner.

The priority of the link direction includes one or more following combinations:

- an uplink direction with a high priority, and a downlink direction with the high priority;
- an uplink direction with the high priority, a downlink direction with the high priority, and a mixed priority;
- an uplink direction with the high priority, an uplink direction with a less high priority, a downlink direction with the high priority, a downlink direction with the less high priority, and the mixed priority;
- an uplink direction with the high priority, a downlink direction with the high priority, and a downlink direction with the less high priority;
- an uplink direction with the high priority, a downlink direction with the high priority, a downlink direction with the less high priority, and the mixed priority;
- an uplink direction with the high priority, an uplink direction with the less high priority, and a downlink direction with the high priority;
- an uplink direction with the high priority, an uplink direction with the less high priority, a downlink direction with the high priority, and the mixed priority;
- an uplink direction with the high priority, and an uplink direction with the less high priority;
- an uplink direction with the high priority, an uplink direction with the less high priority, and the mixed priority;
- a downlink direction with the high priority, and a downlink direction with the less high priority;
- a downlink direction with the high priority, a downlink direction with the less high priority, and the mixed priority;
- the mixed priority;
- the priority of the link direction being dominated by a priority of an uplink direction (corresponding to the priority of the link direction being dominated the uplink direction with the high priority in the embodiments), and the priority of the link direction being dominated by a downlink direction with the high priority (corresponding to the priority of the link direction being dominated the downlink direction with the high priority in the embodiments);
- the priority of the link direction being dominated by an uplink direction with the high priority;
- the priority of the link direction being dominated by a downlink direction with the high priority, and the mixed priority;
- the priority of the link direction being dominated by a downlink direction with the high priority, and the mixed priority; and
- the priority of the link direction being dominated by an uplink direction with the high priority, and the mixed priority.

It should be noted that, the mixed priority has a same priority for the uplink direction and the downlink direction.

It should be noted that, on the system resource, the method for determining the link direction may be compatible with traditional manners, such as the sub-frame ratio mode, but it is not limited thereto.

In step 404, the predefined pattern is interacted or broadcasted within a certain range.

It should be noted that, in the step 404 may not be executed, i.e., the predefined pattern within the certain range may not be interacted or broadcasted, and the predefined pattern determined in step 402 may not be processed.

For one or more network nodes in the certain range include one or more kinds of following nodes:

- all nodes included in the network;
- all base station nodes included in the network;
- all UE nodes included in the network;
- all nodes, base station nodes, UE nodes, partially scheduled nodes, strongly interfering nodes or customized nodes included in a unit, where the unit is composed of a sector, a base station, a or more customized nodes in the network.

It should be noted that, an interaction between the nodes refers to an interaction of the predefined pattern of the link direction among network nodes within the certain range, to determine the priority of the link direction.

Figure 5:
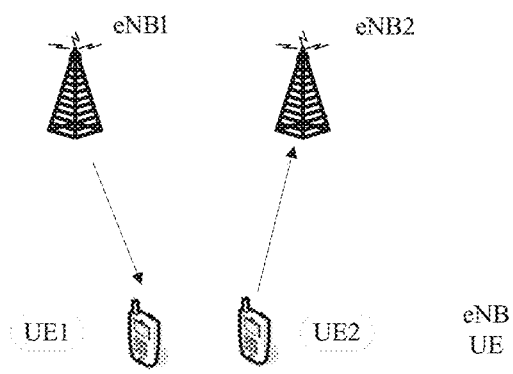
FIG. 5 is a schematic diagram of a scenario of interaction or broadcast in a predefined pattern according to the preferred embodiment 1 of the present disclosure.

FIG. 5 is a schematic diagram of a scenario of an interaction or broadcast of a predefined pattern according to preferred embodiment 1 of the present disclosure. As shown in FIG. 5, in five consecutive slots, eNB1 has a predefined pattern of 'DDDUU' and eNB2 has a predefined pattern of 'UUDUU'. After the predefined patterns are determined, eNB1 and eNB2 interact the two predefined patterns. After the interaction, each of eNB1 and eNB2 compares or learns its own predefined pattern and the predefined pattern for links of the opposite side. Through learning eNB2 determines that downlink data transmitted by eNB1 in first and second slots causes serious interference to eNB2, so eNB2 adjusts its predefined pattern to a new pattern of 'DDDUU', and eNB1 makes no adjustment through learning. Then eNB1 and eNB2 interact again with predefined patterns of their own base station. 'D' represents the link direction with a high downlink priority and 'U' represents the link direction with a high uplink priority.

It should be noted that the broadcast to network nodes within the certain range refers to a broadcast for a predefined pattern of the link direction by system nodes within the certain range, and the nodes in the network determine the priority of the link direction according to the predefined pattern.

As shown in FIG. 5, there are two base stations eNB1 and eNB2, and two UE nodes in the network. In five consecutive slots, eNB1 has a predefined pattern of 'DDDUU' and eNB2 has a predefined pattern of 'UUDUU'. After the predefined patterns are determined, following operations will be executed.

1) Broadcast: eNB1 broadcasts its predefined pattern. After receiving the predefined pattern 'DDDUU' broadcasted by eNB1, eNB2 determines that downlink data transmitted by eNB1 in first and second slots causes serious interference to eNB2. So eNB2 adjusts its predefined pattern to a new pattern of 'DDDUU'.

2) Interaction: eNB1 transmits its predefined pattern to eNB2. After receiving the predefined pattern 'DDDUU' transmitted by eNB1, eNB2 determines that downlink data transmitted by eNB1 in first and second slots causes serious interference to eNB2 through comparison or learning of the predefined pattern of eNB2 and the predefined pattern of eNB1. So eNB2 adjusts its predefined pattern to a new pattern of 'DDDUU', and then transmits the new predefined pattern to eNB1.

It should be noted that, the interaction between network nodes within the certain range or the broadcast to network nodes within the certain range is performed at a frequency as follows:

Periodic: one or more slots, one or more min slots, one or more non-slots, one or more sub-frames, or a number N of milliseconds, where N is a natural number greater than zero;

Non-periodic: the interaction or broadcast is implemented at any time according to an arrival of a data packet in the network or the increase of the network load.

Preferably, N has a value of 2 ms, 5 ms, 10 ms, 20 ms, 50 ms, 80 ms, 100 ms, or 200 ms.

In step 406, corresponding nodes in the network are sensed or adjusted according to the interacted or broadcasted predefined pattern.

According to the interacted or broadcasted predefined pattern, corresponding processing will be performed on the corresponding nodes in the network.

It should be noted that, in the link direction with high priority, when data is transmitted in a same link direction, or the data in a system buffer has a relatively large amount, or specified information needs to be transmitted, the data may be directly transmitted, or may be transmitted with high power or with a spatial direction adjusted to a preferred direction (equivalent to the information is transmitted in a spatial direction corresponding to the first direction in the embodiments), or may be conditionally transmitted or transmitted with a certain probability; when in the link direction with the high priority no data is transmitted or a probability of transmitting no data is large, the data may be transmitted conditionally or transmitted with a certain probability or transmitted directly in the link direction with the low priority or a link direction opposite to the link direction with the high priority.

It should be noted that, the conditional transmission refers that the node implements the LBT operation, reduces or increases the transmit power, etc. and adjusts its spatial transmission direction to a better direction (corresponding to the first direction in the embodiments) or a worse direction (corresponding to the second direction in the embodiments).

It should be noted that, the transmission with the certain probability is related to a selected sensing moment of the LBT or a contention window size.

It should be noted that, in the link direction with the mixed priority, a final link direction may be determined by a buffer size, a receive power, a signal-to-interference ratio or a signal-to-noise ratio. The final link direction may also be determined according to an ACK proportion within a certain time period, or a customized indicator.

It should be noted that the certain time period may include one or more of:
  a slot of a moment for receiving feedback of an acknowledgment signal (ACK);
  one or more previous sub-frames, slots, min slots or non-slots;
  any time period before this sub-frame.

It should be noted that, in the link direction with the low priority the data may be conditionally transmitted (including the LBT), or directly transmitted.

It should be noted that, the LBT operation is executed by one or more of: a transmitting node for the LBT operation, a receiving node for the LBT operation, a subject on a base station side of the LBT operation, a subject on a user equipment side of the LBT operation.

It should be noted that, the LBT operation is executed on one or more following sensing moments or time periods: a start moment or an end moment of one or more symbols before a moment for transmitting data; an end moment of one or more sub-frames or slots before a sub-frame or slot for transmitting the data; or a moment or time period before transmitting the information.

It should be noted that, the LBT operation specifically includes one or more of followings: one or more candidate moments are selected by the LBT operation subject, and the operation subject may select one or more from the candidate moments to execute the LBT operation; or a listen-before-talk (LBT) mechanism in a licensed assisted access (LAA) standard or a LBT mechanism in a wireless local area network (WLAN) standard is selected by the LBT operation subject to execute the LBT operation.

It should be noted that, each LBT subject in the system or in a set uses a same LBT mechanism.

It should be noted that, after the LBT subject has successfully executed the LBT, the execution subject needs to transmit an occupation signal until a start time of transmitting the data.

It should be noted that, the one or more candidate operation moments include one or more kinds of following moments: the candidate operation moments are equally spaced; the candidate operation moments are unequally spaced.

It should be noted that, the candidate operation moments have an equally spaced interval of 9 microseconds.

Figure 6:
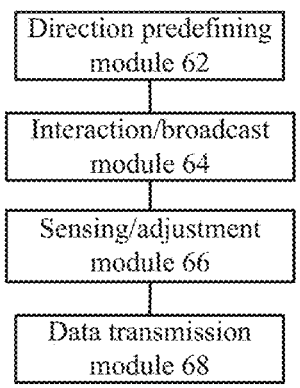
FIG. 6 is a structural diagram of a processing device according to the preferred embodiment 1 of the present disclosure.

In a preferred embodiment of the present disclosure a processing device is provided. FIG. 6 is a structural diagram of a processing device according to the preferred embodiment 1 of the present disclosure. As shown in FIG. 6, the device includes a direction predefining module 62, an interaction/broadcast module 64, a sensing/adjustment module 66 and a data transmission module 68.

The direction predefining module 62 is configured to predefine a predefined pattern of a link direction of a communication system resource and determine priority characteristics of the link direction.

The interaction/broadcast module 64 is configured to interact or broadcast the predefined pattern of the link direction between nodes and determine the priority characteristics of the link direction.

The sensing/adjustment module 66 is configured to, for the node in the link direction with a high priority, select a sensing mechanism with a high success probability, directly transmit without sensing, adjust transmit power to high power or adjust the spatial direction of the node to facilitate data transmission; and for the node in the link direction, select a sensing mechanism with a low success probability, sense all, do not sense, adjust the transmit power to low power or adjust the spatial direction of the node to avoid interference to the high priority link direction.

It should be noted that, the sensing mechanism with a small success probability (equivalent to the sensing mechanism in the above embodiments which the probability of sensing success is smaller than the third predetermined threshold) may be obtained by adjusting sensing position or reducing sensing threshold; and the sensing mechanism with a high success probability (equivalent to the sensing mechanism in the above embodiments which the probability of sensing success is greater than the first predetermined threshold) may be obtained by adjusting the sensing position or increasing the sensing threshold.

When in the link direction with the high priority no data is transmitted or a probability of transmitting no data is large (corresponding to the probability of transmission no information in the above embodiments which is larger than the fifth predetermined threshold), the link with the low priority or the link in opposite direction to the link direction may conditionally transmit data or transmit data with a certain probability or transmit at reduced transmit power.

It should be noted that, the transmission with the certain probability is related to a corresponding selected sensing moment of the LBT.

A link direction with the low priority or a link direction opposite to the link direction may implement the LBT operation, or have reduced power, or adjust the spatial direction of the transmitting node.

It should be noted that, the LBT operation is executed by one or more of:
  a transmitting node for the LBT operation,
  a receiving node for the LBT operation,
  a subject on a base station side of the LBT operation,
  a subject on a user equipment side of the LBT operation.

It should be noted that, the LBT operation is executed on one or more of following moments or time periods: a start moment or an end moment of one or more symbols before a moment for transmitting information transmission; an end moment of one or more sub-frames or slots before a sub-frame or slot for transmitting the information; or a moment or time period before transmitting the information.

It should be noted that, the LBT operation specifically includes one or more of: one or more candidate moments are selected by the LBT operation subject, and the operation subject may select one or more from the candidate moments to execute the LBT operation; a LBT mechanism in a LAA standard or a LBT mechanism in a WLAN standard is selected by the LBT operation subject to execute the LBT operation.

It should be noted that, after the LBT operation subject have successfully executed the LBT operation, the execution subject needs to transmit an occupation signal until the start time of transmitting the data.

It should be noted that, the one or more candidate operation moments include one or more of following moments: the candidate operation moments are equally spaced; the candidate operation moments are unequally spaced.

It should be noted that, the candidate operation moments have an equally spaced interval of 9 microseconds.

For the base station, the priority of the link direction may be notified to a user equipment through a bitmap.

It should be noted that, in the bitmap manner, one, two or three digital bits represent different link directions.

It should be noted that, the one, two or three digital bits represent different link directions in one or more of following manners:

"1" indicates the link direction of an uplink direction with a high priority and "0" indicates the link direction of a downlink direction with the high priority; "10" indicates the link direction of an uplink direction with the high priority, "01" indicates the link direction of a downlink direction with the high priority; and "11" indicates the mixed priority of the link direction;

"1" indicates the priority of the link direction being dominated by an uplink direction and "0" indicates the priority of the link direction being dominated by a downlink direction;

"10" indicates the link direction being dominated by an uplink direction, "01" indicates the link direction being dominated by a downlink direction and "11" indicates the mixed priority of the link direction;

"100" indicates the link direction of a downlink direction with the high priority, "101" indicates the link direction of a downlink direction with a less high priority, "110" indicates the link direction of an uplink direction with the high priority, "001" indicates the link direction of an uplink direction with the less high priority, and "010" indicates the mixed priority of the link direction.

Specifically, the notification signaling carrying the bitmap is a downlink control information (DCI) or a radio resource control (RRC), which may be transmitted periodically or non-periodically. The period is M ms and M being an integer greater than zero.

Preferably, M has a value of 10 ms, 20 ms, 50 ms, 80 ms, or 100 ms.

The data transmission module 68 is configured to transmit the data after making adjustments for nodes including successfully sensed nodes, nodes for directly transmitting data, nodes for increasing transmit power, nodes for decreasing the transmit power, or spatially coordinated nodes.

Preferred Embodiment 2

In a configuration of config1 of traditional time division multiplexing TDD, the link direction of a communication system resource is predetermined.

The link direction is determined as the link direction with a high priority, for a link direction opposite to the link direction is determined as the link direction with a low priority.

For the predefined pattern no interaction or broadcast is executed.

When in the link direction with the high priority data is transmitted in a same link direction, a large amount of data is in a system buffer, or important information needs to be transmitted, the data may be directly transmitted.

When in the link direction with the high priority no data is transmitted, the data may be conditionally transmitted in the link direction with the low priority.

In the link direction with the low priority, the data may be conditionally transmitted, including the LBT operation.

The LBT operation is executed by a transmitting node, which operation is executed on the first symbol of the sub-frame of a moment for transmitting the data.

More candidate operation moments are selected by the LBT operation subject, any one of the candidate operation moments may be selected.

After the LBT operation subject has successfully executed the LBT operation, the operation subject needs to transmit an occupation signal until a start time for transmitting the data.

The candidate operation moments are equally spaced, which have an interval of 9 microseconds.

Since the base station is using the traditional TDD configuration, there is no need to notify a UE of the priority pattern of the link direction.

Figure 7:
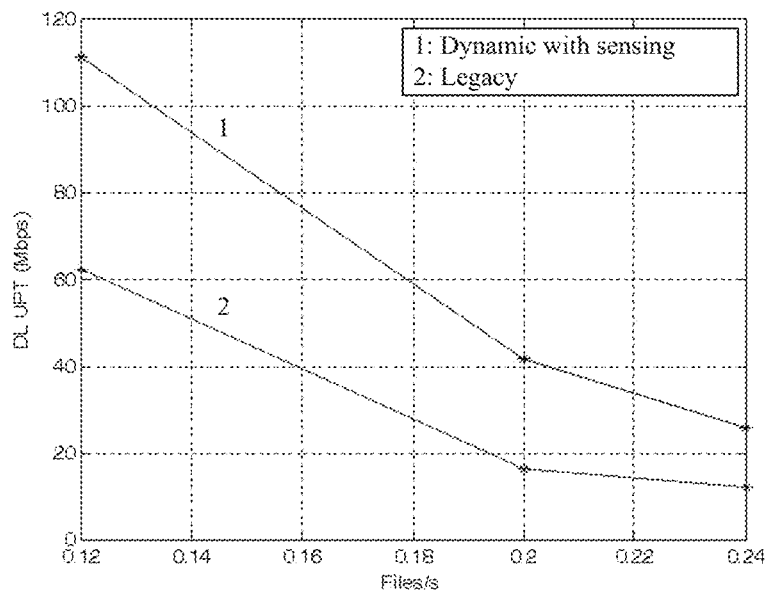
FIG. 7 is a schematic diagram of an uplink performance gain according to preferred embodiment 2 of the present disclosure.
Figure 8:
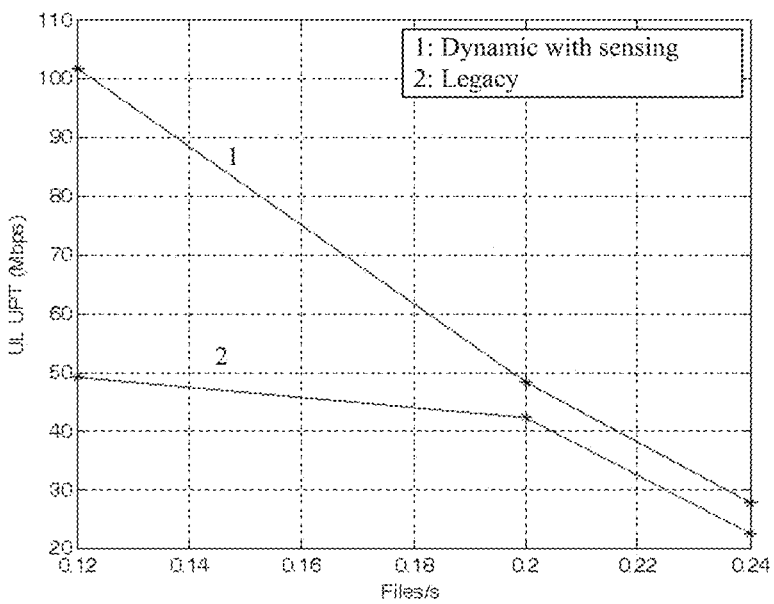
FIG. 8 is a schematic diagram of a downlink performance gain according to preferred embodiment 2 of the present disclosure.

FIG. 7 is a schematic diagram of an uplink performance gain according to the preferred embodiment 2 of the present disclosure, and FIG. 8 is a schematic diagram of a downlink performance gain according to the preferred embodiment 2 of the present disclosure. As shown in FIG. 7 or FIG. 8, the downlink performance gain and/or the uplink performance gain are/is significantly increased by the preferred embodiments. In FIGS. 7 and 8, the abscissa represents a physical quantity of traffic with a unit of files/s, which unit represents an arrival number of data packets in one second; and the ordinate represents a physical quantity of user perceived throughput (UPT) of data transmitted by a UE on the downlink (DL)/uplink (UL) with a unit of Mbps (megabits per second). In FIGS. 7 and 8, curve 1 is a curve of the uplink or downlink performance gain according to the preferred embodiment 2 of the present disclosure, and curve 2 is the gain curve in the related art. In FIGS. 7 and 8, at a same value on the the abscissas, the curve 1 has a greater value on the ordinate than that of the ordinate on curve 2, which means the UE of the preferred embodiment 2 of the present disclosure is greater than the UE in the related art under a same traffic load. Thus, the present disclosure can significantly improve the throughput performance.

Preferred Embodiment 3

The processing in an asynchronous state of the nodes in the network is described below.

As shown in FIG. 5, there are two base stations eNB1 and eNB2, and two UE nodes in the network. In five consecutive slots, eNB1 has a predefined pattern of "DDDUU" and eNB2 has a predefined pattern of "UUDUU", the step in which the predefined patterns is determined through an interaction is processed as follows.

The eNB1 transmits its predefined pattern to eNB2. After receiving the predefined pattern "DDDUU" transmitted by eNB1, eNB2 determines that downlink data transmitted by eNB1 in first and second slots causes serious interference to eNB2 through comparison or learning of the predefined pattern of eNB2 and the predefined pattern of eNB1. So eNB2 adjusts its predefined pattern to a new pattern of "DDDUU", and then transmits this new predefined pattern to eNB1. "D" represents the link direction with a high downlink priority and "U" represents the link direction with a high uplink priority.

For the determined pattern, nodes may perform judgement through timely sensing or according to an average interference. The average interference is calculated based on interference during a period.

Preferably, the time period may be one or more slots or min slots.

Preferred Embodiment 4

As shown in FIG. 5, there are two base stations eNB1 and eNB2, and two UE nodes in the network.

In a slot, eNB1 has a downlink direction with a high priority and eNB2 has an uplink direction with a low priority. First symbol at the beginning of the slot is used for sensing. There are three sensing positions, which are located at distances of 9 microseconds, 18 microseconds and 27 microseconds in the first symbol respectively.

In the link direction with the high priority, when data is transmitted in a same link direction, data in a system buffer has a relatively large amount, or important information needs to be transmitted, the data may be directly transmitted, or may be transmitted with high power or with a beam direction adjusted to a preferred direction, or may be conditionally transmitted or transmitted with a certain probability.

The eNB1 may arbitrarily select 9 microseconds or 18 microseconds as a sensing point.

When in the link direction with the high priority no data is transmitted or a probability of transmitting no data is large, in the link direction with the low priority or a link direction opposite to the link direction with the high priority the data may be transmitted conditionally or transmitted with a certain probability or transmitted directly.

The eNB2 may arbitrarily select 18 microseconds or 27 microseconds as a sensing point.

In this way, the link direction with the high priority may have a high probability of sensing success, and the link direction with the low priority may have a low probability of sensing success.

Preferred Embodiment 5

As shown in FIG. 5, there are two base stations eNB1 and eNB2, and two UE nodes in the network.

In a slot, eNB1 has a downlink direction with a high priority and eNB2 has an uplink direction with a low priority.

In the link direction with the high priority, when data is transmitted in a same link direction, data in a system buffer has a relatively large amount, or important information needs to be transmitted, data may be directly transmitted, or may be transmitted with high power or with a beam direction adjusted to a preferred direction, or may be conditionally transmitted or transmitted with a certain probability.

The eNB1 may increase the transmit power or maintain an original transmit power to transmit on entire bandwidth or scheduled resources, or eNB1 may adjust the beam direction to a preferred direction of the link to transmit.

When in the link direction with the high priority no data is transmitted or a probability of transmitting no data is large, in the link direction with the low priority or a link direction opposite to the link direction with the high priority data may be transmitted conditionally or transmitted with a certain probability or transmitted directly.

The eNB2 may decrease the transmit power or maintain the original transmit power to transmit on the entire bandwidth or scheduled resources, or eNB2 may adjust the beam direction to a direction with minimum interference to the link of eNB1 to transmit.

The eNB1 and eNB2 may respectively use one or more of given manners at the same time.

It may be understood by those skilled in the art that the embodiments of the present disclosure may be provided as a method, system, or computer program product. Thus, the present disclosure may be implemented in a form of a hardware embodiment, a software embodiment or a combined embodiment of those two. Furthermore, the present disclosure may use a form of a computer program product implemented on one or more computer-usable storage media (including, but not limited to, magnetic disk storages, optical storages, etc.) with computer usable program codes.

The present disclosure is described with reference to the flowcharts and/or block diagrams of methods, apparatus (systems), and computer program products according to the embodiments of the present disclosure. It should be understood that each flow in the flowcharts and/or each block in the block diagrams, and a combination of flows and/or blocks in the flowcharts and/or block diagrams may be implemented by the computer program instructions. These computer program instructions may be provided to a processor of a general purpose computer, special purpose computer, embedded processor, or other programmable data processing apparatus to produce a machine, so that the instructions executed by the processor of the computer or other programmable data processing apparatus produce a device for implementing functions specified in a flow or flows of the flowcharts and/or a block or blocks of the block diagrams.

These computer program instructions may also be stored in a computer-readable memory that may lead a computer or other programmable data processing apparatus to work in a particular manner, so that the instructions stored in the computer-readable memory produce a product including instruction device, which is configured to implement the functions specified in a flow or flows of the flowcharts and/or a block or blocks of the block diagrams.

These computer program instructions may also be loaded onto a computer or other programmable data processing apparatus, so that a series of operational steps are performed on the computer or other programmable apparatus to produce a computer implemented process, so as to provide the instructions executed on the computer or other programmable apparatus for implementing the functions specified in a flow or flows of flowcharts and/or a block or blocks of block diagrams.

The above description is only preferred embodiments of the present disclosure and is not intended to limit the scope of the present disclosure.

INDUSTRIAL APPLICABILITY

Through the present disclosure, a first predefined pattern of a first network node is determined, where the first predefined pattern includes a link direction of a system resource of the first network node and a priority of the link direction; then information transmission is processed according to the first predefined pattern. So that different information transmissions can be processed in link directions with different priorities, and interference of the cross-link interference is reduced. Therefore, the degradation of the system uplink or downlink performance in the related arts can be solved, so as to archive an improvement of the uplink or downlink performance.

What is claimed is:

1. An information transmission processing method, comprising:
   determining a first predefined pattern of a first network node, wherein the first predefined pattern comprises a link direction of a system resource of the first network node and a priority of the link direction; and
   processing information transmission according to the first predefined pattern wherein the information transmission processing method further comprises:
   receiving a second predefined pattern transmitted by a second network node, wherein the second predefined pattern is used for adjusting the first predefined pattern;
   accordingly, wherein processing the information transmission according to the first predefined pattern comprises:
   processing the information transmission according to a pattern resulting from adjustment of the first predefined pattern with the second predefined pattern.

2. The method of claim 1, wherein receiving the second predefined pattern transmitted by the second network node comprises one of:
   receiving the second predefined pattern transmitted by the second network node through an interaction with the second network node; or
   receiving the second predefined pattern broadcasted by the second network node.

3. The method of claim 1, wherein the second network node comprises one of:
   one or more nodes of all nodes in a network with a predetermined range except the first network node;
   one or more base station nodes of all base station nodes in the network with the predetermined range;
   one or more user equipment nodes of all user equipment nodes in the network with the predetermined range;
   one or more nodes included in a predetermined unit of the network with the predetermined range, wherein the predetermined unit comprises one of: a sector, a base station, or a unit composed of one or more nodes.

4. The method of claim 1, wherein receiving the second predefined pattern transmitted by the second network node comprises one of:
   receiving the second predefined pattern transmitted by the second network node with a predetermined period; or
   receiving the second predefined pattern non-periodically transmitted by the second network node.

5. The method of claim 4, wherein receiving the second predefined pattern transmitted by the second network node with the predetermined period comprises at least one of:
   receiving the second predefined pattern transmitted by the second network node through an interaction with the second network node according to the predetermined period; or
   receiving the second predefined pattern broadcasted by the second network node according to the predetermined period;
   wherein the predetermined period comprises at least one of: one or more slots, one or more min slots, one or more non-slots, one or more sub-frames, or a number N of milliseconds, wherein N is a natural number greater than zero.

6. The method of claim 4, wherein receiving the second predefined pattern non-periodically transmitted by the second network node comprises:
   determining to interact with the second network node or to trigger the second network node to broadcast according to arrival of a data packet and/or a network load in the network; and
   receiving the second predefined pattern transmitted by the second network node.

7. The method of claim 1, wherein the system resource comprises: a time domain resource and/or a frequency domain resource;
   wherein the time domain resource comprises at least one of: one or more min slots, one or more non-slots, one or more slots, one or more sub-frames, one or more radio frames, an unfixed period of time, or a fixed period of time;
   wherein the frequency domain resource comprises at least one of: one or more resource blocks, one or more sub-bands, an unfixed bandwidth or a fixed bandwidth.

8. The method of claim 1, comprising:
   determining the priority of the link direction in at least one of following manners:
   determining the priority of the link direction according to a load size or a cache data size of a system where the first network node is located;
   determining the priority of the link direction according to an information transmitted on the system resource of the system where the first network node is located;
   determining the priority of the link direction according to a priority relationship between a link direction of a primary cell and a link direction of a secondary cell of the system where the first network node is located;
   determining the priority of the link direction according to a priority relationship of link directions of different system resources of the system where the first network node is located;
   determining the priority of the link direction according to a priority relationship of different subcarrier spacings of the system where the first network node is located;
   determining the priority of the link direction according to a predetermined priority of the link direction; or
   determining the priority of the link direction in a customized manner,
   wherein the priority of the link direction includes one of following combinations:
   an uplink direction with a high priority, and a downlink direction with the high priority;
   an uplink direction with the high priority, a downlink direction with the high priority, and a mixed priority;

an uplink direction with the high priority, an uplink direction with a less high priority, a downlink direction with the high priority, a downlink direction with the less high priority, and the mixed priority;

an uplink direction with the high priority, a downlink direction with the high priority, and a downlink direction with the less high priority;

an uplink direction with the high priority, a downlink direction with the high priority, a downlink direction with the less high priority, and the mixed priority;

an uplink direction with the high priority, an uplink direction with the less high priority, and a downlink direction with the high priority;

an uplink direction with the high priority, an uplink direction with the less high priority, a downlink direction with the high priority, and the mixed priority;

an uplink direction with the high priority, and an uplink direction with the less high priority;

an uplink direction with the high priority, an uplink direction with the less high priority, and the mixed priority;

a downlink direction with the high priority, and a downlink direction with the less high priority;

a downlink direction with the high priority, a downlink direction with the less high priority, and the mixed priority;

the mixed priority;

the priority of the link direction being dominated by an uplink direction with the high priority, and the priority of the link direction being dominated by a downlink direction with the high priority;

the priority of the link direction being dominated by an uplink direction with the high priority, the priority of the link direction being dominated by a downlink direction with the high priority, and the mixed priority;

the priority of the link direction being dominated by a downlink direction with the high priority, and the mixed priority; or the priority of the link direction being dominated by an uplink direction with the high priority, and the mixed priority;

wherein the mixed priority has a same priority for the uplink direction and the downlink direction.

9. The method of claim 1, wherein before processing the information transmission according to the first predefined pattern, the method further comprises:
notifying, through a bitmap, a user equipment of the priority of the link direction in the first predefined pattern.

10. A non-transitory computer readable medium, comprising stored programs, wherein the programs, when executed, implement the information transmission processing method according to claim 1.

11. An information transmission processing device, comprising:
a determination module, which is configured to determine a first predefined pattern of a first network node, wherein the first predefined pattern comprises a link direction of a system resource of the first network node and a priority of the link direction; and
a processing module, which is configured to process information transmission according to the first predefined pattern;
wherein the information transmission processing device further comprises:
a receiving module, which is configured to receive a second predefined pattern transmitted by a second network node, wherein the second predefined pattern is used for adjusting the first predefined pattern;
wherein the processing module is further configured to process the information transmission according to a pattern resulting from adjustment of the first predefined pattern with the second predefined pattern.

12. The device of claim 11, wherein the receiving module is further configured to execute one of following operations:
receiving the second predefined pattern transmitted by the second network node through an interaction with the second network node; or
receiving the second predefined pattern broadcasted by the second network node.

13. The device of claim 11, wherein the determination module is further configured to determine the priority of the link direction in at least one of following manners:
determining the priority of the link direction according to a load size or a cache data size of a system where the first network node is located;
determining the priority of the link direction according to an information transmitted on the system resource of the system where the first network node is located;
determining the priority of the link direction according to a priority relationship between a link direction of a primary cell and a link direction of a secondary cell of the system where the first network node is located;
determining the priority of the link direction according to a priority relationship of link directions of different system resources of the system where the first network node is located;
determining the priority of the link direction according to a priority relationship of different subcarrier spacings of the system where the first network node is located;
determining the priority of the link direction according to a predetermined priority of the link direction; or
determining the priority of the link direction in a customized manner,
wherein the priority of the link direction includes one of following combinations:
an uplink direction with a high priority, and a downlink direction with the high priority;
an uplink direction with the high priority, a downlink direction with the high priority, and a mixed priority;
an uplink direction with the high priority, an uplink direction with a less high priority, a downlink direction with the high priority, a downlink direction with the less high priority, and the mixed priority;
an uplink direction with the high priority, a downlink direction with the high priority, and a downlink direction with the less high priority;
an uplink direction with the high priority, a downlink direction with the high priority, a downlink direction with the less high priority, and the mixed priority;
an uplink direction with the high priority, an uplink direction with the less high priority, and a downlink direction with the high priority;
an uplink direction with the high priority, an uplink direction with the less high priority, a downlink direction with the high priority, and the mixed priority;
an uplink direction with the high priority, and an uplink direction with the less high priority;
an uplink direction with the high priority, an uplink direction with the less high priority, and the mixed priority;
a downlink direction with the high priority, and a downlink direction with the less high priority;

a downlink direction with the high priority, a downlink direction with the less high priority, and the mixed priority;

the mixed priority;

the priority of the link direction being dominated by an uplink direction with the high priority, and the priority of the link direction being dominated by a downlink direction with the high priority;

the priority of the link direction being dominated by an uplink direction with the high priority, the priority of the link direction being dominated by a downlink direction with the high priority, and the mixed priority;

the priority of the link direction being dominated by a downlink direction with the high priority, and the mixed priority; or the priority of the link direction being dominated by an uplink direction with the high priority, and the mixed priority;

wherein the mixed priority has a same priority for the uplink direction and the downlink direction.

14. A node, comprising:

a processor and a memory, wherein the processor is configured to, when executing a program stored in the memory, execute at least following operations:

determining a first predefined pattern of a first network node, wherein the first predefined pattern comprises a link direction of a system resource of the first network node and a priority of the link direction; and processing information transmission according to the first predefined pattern, the memory is coupled to the processor and is used for storing the program;

wherein the processor is further configured to, when executing the program, execute following operations:

receiving a second predefined pattern transmitted by a second network node, wherein the second predefined pattern is used for adjusting the first predefined pattern; and processing the information transmission according to a pattern resulting from adjustment of the first predefined pattern with the second predefined pattern.

15. The node of claim 14, wherein the processor is further configured to, when executing the program, execute one of following operations:

receiving the second predefined pattern transmitted by the second network node through an interaction with the second network node; or receiving the second predefined pattern broadcasted by the second network node.

16. The node of claim 14, wherein the processor is further configured to, when executing the program, determine the priority of the link direction in at least one of following manners:

determining the priority of the link direction according to a load size or a cache data size of a system where the first network node is located;

determining the priority of the link direction according to an information transmitted on the system resource of the system where the first network node is located;

determining the priority of the link direction according to a priority relationship between a link direction of a primary cell and a link direction of a secondary cell of the system where the first network node is located;

determining the priority of the link direction according to a priority relationship of link directions of different system resources in the system where the first network node is located;

determining the priority of the link direction according to a priority relationship of different subcarrier spacings of the system where the first network node is located;

determining the priority of the link direction according to a predetermined priority of the link direction; or determining the priority of the link direction in a customized manner, wherein the priority of the link direction includes one of following combinations:

an uplink direction with a high priority, and a downlink direction with the high priority;

an uplink direction with the high priority, a downlink direction with the high priority, and a mixed priority;

an uplink direction with the high priority, an uplink direction with a less high priority, a downlink direction with the high priority, a downlink direction with the less high priority, and the mixed priority;

an uplink direction with the high priority, a downlink direction with the high priority, and a downlink direction with the less high priority;

an uplink direction with the high priority, a downlink direction with the high priority, a downlink direction with the less high priority, and the mixed priority;

an uplink direction with the high priority, an uplink direction with the less high priority, and a downlink direction with the high priority;

an uplink direction with the high priority, an uplink direction with the less high priority, a downlink direction with the high priority, and the mixed priority;

an uplink direction with the high priority, and an uplink direction with the less high priority;

an uplink direction with the high priority, an uplink direction with the less high priority, and the mixed priority;

a downlink direction with the high priority, and a downlink direction with the less high priority;

a downlink direction with the high priority, a downlink direction with the less high priority, and the mixed priority;

the mixed priority;

the priority of the link direction being dominated by an uplink direction with the high priority, and the priority of the link direction being dominated by a downlink direction with the high priority;

the priority of the link direction being dominated by an uplink direction with the high priority, the priority of the link direction being dominated by a downlink direction with the high priority, and the mixed priority;

the priority of the link direction being dominated by a downlink direction with the high priority, and the mixed priority; or the priority of the link direction being dominated by an uplink direction with the high priority, and the mixed priority;

wherein the mixed priority has a same priority for the uplink direction and the downlink direction.

17. The node of claim 14, wherein the processor is further configured to, when executing the program, execute a following operation:

notifying, through a bitmap, a user equipment of the priority of the link direction in the first predefined pattern.

* * * * *